United States Patent
Hiraishi et al.

(10) Patent No.: US 12,215,218 B2
(45) Date of Patent: Feb. 4, 2025

(54) HITTING SOUND REDUCING MATERIAL AND THERMOPLASTIC RESIN COMPOSITION

(71) Applicant: TECHNO-UMG CO., LTD., Tokyo (JP)

(72) Inventors: Kentaro Hiraishi, Tokyo (JP); Taichi Maruyama, Tokyo (JP); Hironori Kitaguchi, Tokyo (JP)

(73) Assignee: TECHNO-UMG CO., LTD., Tokyo (JP)

( * ) Notice: Subject to any disclaimer, the term of this patent is extended or adjusted under 35 U.S.C. 154(b) by 0 days.

(21) Appl. No.: 18/726,823

(22) PCT Filed: Sep. 22, 2023

(86) PCT No.: PCT/JP2023/034461
§ 371 (c)(1),
(2) Date: Jul. 5, 2024

(87) PCT Pub. No.: WO2024/116569
PCT Pub. Date: Jun. 6, 2024

(65) Prior Publication Data
US 2024/0425690 A1 Dec. 26, 2024

(30) Foreign Application Priority Data
Dec. 1, 2022 (JP) ................ 2022-192966

(51) Int. Cl.
*C08L 25/16* (2006.01)
*C08L 69/00* (2006.01)

(52) U.S. Cl.
CPC .............. *C08L 25/16* (2013.01); *C08L 69/00* (2013.01); *C08L 2203/30* (2013.01); *C08L 2205/025* (2013.01); *C08L 2205/035* (2013.01)

(58) Field of Classification Search
CPC ................................ C08L 13/00; C08L 33/08
See application file for complete search history.

(56) References Cited

U.S. PATENT DOCUMENTS

| 2023/0087173 A1 | 3/2023 | Fujii et al. |
| 2023/0118932 A1 | 4/2023 | Fujii et al. |

FOREIGN PATENT DOCUMENTS

| CN | 113614178 A | 11/2021 |
| JP | H03-045646 A | 2/1991 |

(Continued)

OTHER PUBLICATIONS

PCT/ISA/220 and PCT/ISA/237, "Written Opinion for PCT International Application No. PCT/JP2023/034461," Oct. 31, 2023, 8 pp.
(Continued)

*Primary Examiner* — Mark S Kaucher
(74) *Attorney, Agent, or Firm* — HAUPTMAN HAM, LLP

(57) ABSTRACT

A hitting sound reducing material made of a (meth)acrylic acid ester polymer (B) comprising: a polymer (b1) comprising a structural unit derived from an acrylic ester compound and a structural unit derived from a methacrylic ester compound, and having a glass transition temperature of −15° C. to +5° C.; and a polymer (b2) comprising at least one selected from the group consisting of a structural unit derived from a methacrylic acid ester compound, a structural unit derived from an aromatic vinyl compound, and a structural unit derived from a vinyl cyanide compound, wherein the polymer (b1) has a temperature (peak temperature) indicating a peak value of a main dispersion of tan δ of −5° C. to +20° C., and a peak intensity, which is a peak value of the intensity, of 2.055 or more.

5 Claims, 1 Drawing Sheet

(56) References Cited

FOREIGN PATENT DOCUMENTS

| | | |
|---|---|---|
| JP | H08-003249 A | 1/1996 |
| JP | 2000-230104 A | 8/2000 |
| JP | 2001-158841 A | 6/2001 |
| JP | 2013-112812 A | 6/2013 |
| JP | 2020-139028 A | 9/2020 |
| JP | 2022-143324 A | 10/2022 |
| JP | 2022-150927 A | 10/2022 |
| WO | 2020/175612 A1 | 9/2020 |
| WO | 2020/195798 A1 | 10/2020 |
| WO | 2022/195972 A1 | 9/2022 |

OTHER PUBLICATIONS

PCT/ISA/210, "International Search Report, PCT International Application No. PCT/JP2023/034461," Oct. 31, 2023, 5 pp.

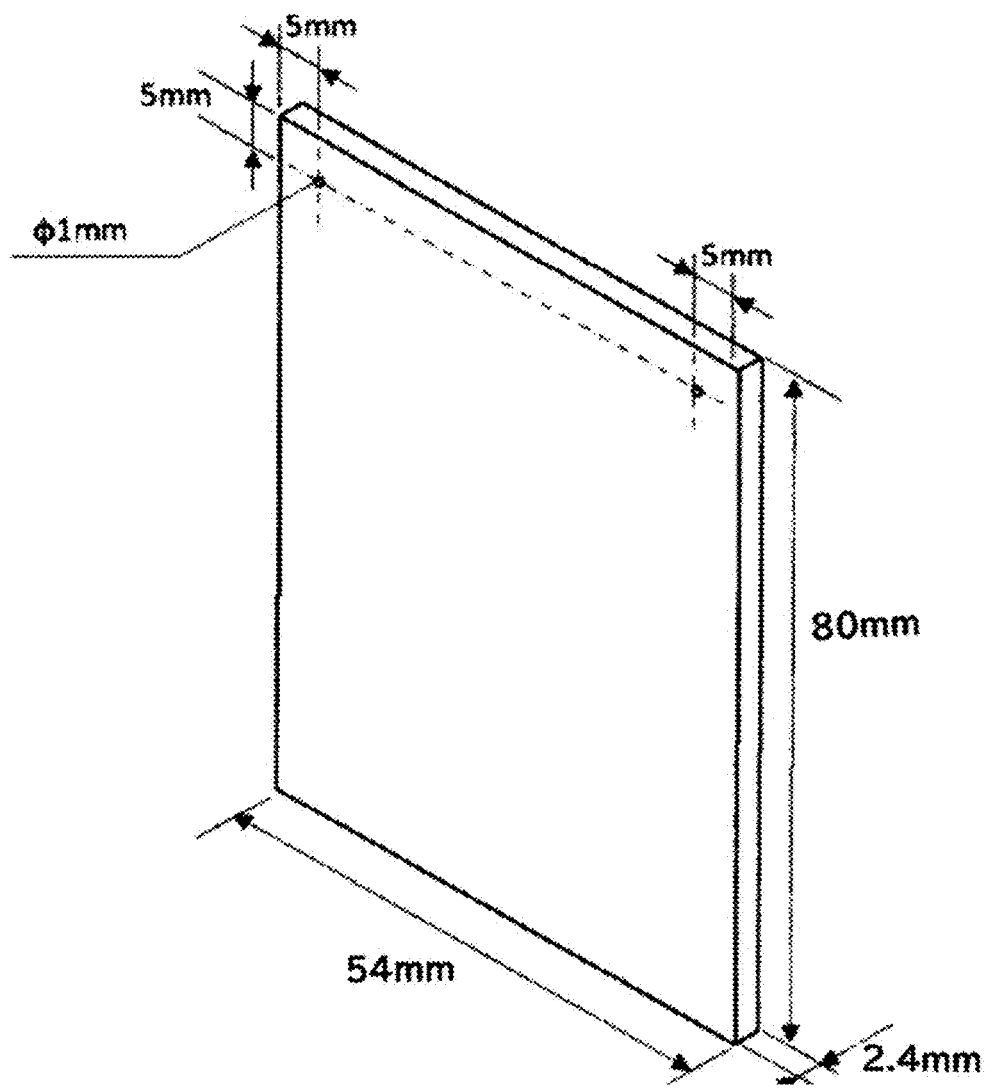

HITTING SOUND REDUCING MATERIAL AND THERMOPLASTIC RESIN COMPOSITION

TECHNICAL FIELD

The present invention relates to a thermoplastic resin composition that, when blended into a thermoplastic resin composition, can provide a molded article that has excellent mechanical properties such as surface gloss, impact resistance, and rigidity, and in which generation of a hitting sound is reduced. The present invention also relates to a thermoplastic resin composition containing this hitting sound reducing material.

BACKGROUND ART

Rubber-reinforced resins, such as ABS resins, have excellent mechanical properties, heat resistance, and moldability and are, therefore, widely used as a molding material for vehicle components, such as automotive interior components.

In instances where a vehicle component is molded from a resin, it is required not only to satisfy specified or higher degree of mechanical strengths but also to, for ride comfort in the vehicle, reduce an amount of noise generated by the component, thereby improving the quietness of the vehicle.

One attempt that has been made in the related art involves molding an automotive interior component from a rubber-reinforced resin in which an ethylene-α-olefin-based rubbery polymer is used as a rubber component, thereby preventing squeaks from being generated when components come into contact with each other, while maintaining mechanical strength at a certain level (Patent Literature 1). In the Patent Literature 1, however, inhibition of a noise called a rattle, which is a noise like a hitting sound, has not been achieved.

Another proposal that has been made is to include an elastomeric block polymer in a flame-retardant rubber-reinforced resin to achieve a loss factor at 25° C. at a second resonance frequency of 0.02 or greater so that vibrations can be reduced, thereby providing a flame-retardant resin composition having an excellent vibration damping property (Patent Literatures 2 to 4). However, Patent Literatures 2 to 4 do not address reducing noise such as a hitting sound.

To solve the problem, still another proposal has been made by the present applicant for providing a thermoplastic resin composition that can form a molded article in which the generation of hitting sounds is reduced and also in which, preferably, a gloss of the molded article is favorably maintained, and, further preferably, the generation of squeaks is inhibited; the thermoplastic resin composition is formed of at least a rubber-reinforced styrenic thermoplastic resin (A1), which includes, as a rubbery component, a specific thermoplastic elastomer that serves as a hitting sound reducing material; and the thermoplastic resin composition has a loss factor (11) of greater than or equal to a specific value for a frequency range of 20 to 12,400 Hz (Patent Literature 5).

In addition, in order to maintain the hitting sound reduction effect described in Patent Literature 5 and improve the appearance of the molded article such as color properties and gloss, and the surface impact resistance, the present applicant has developed a thermoplastic resin composition having a hitting sound reducing material (Patent Literature 6). The thermoplastic resin composition comprises the hitting sound reducing material is a hydrogenated copolymer derived from hydrogenation of a copolymer formed of a block portion (I) and a random portion (II), the block portion (I) primarily including structural units derived from an aromatic vinyl-based compound, the random portion (II) primarily including structural units derived from an aromatic vinyl-based compound and structural units derived from butadiene, the structural units derived from an aromatic vinyl-based compound in the block portion (I) and the structural units derived from an aromatic vinyl-based compound in the random portion (II) are present in a total content of 55 to 80 mass % relative to a total mass of the copolymer taken as 100 mass %, and the hydrogenated copolymer has a primary dispersion peak of tan δ at 0° C. or higher.

CITATION LIST

Patent Literature

PTL 1: JP 2013-112812 A
PTL 2: JP 2001-158841 A
PTL 3: JP H3-45646 A
PTL 4: JP H8-3249 A
PTL 5: JP 2020-139028 A
PTL 6: JP 2022-143324 A

SUMMARY OF INVENTION

Technical Problem

The thermoplastic resin composition of Patent Literature 6 is not fully satisfactory in terms of mechanical properties such as impact resistance, and further improvement is desired in order to develop it into a wide range of applications.

An object of the present invention is to provide a hitting sound reducing material which, when blended into a thermoplastic resin composition, can reduce the generation of hitting sounds and provide a molded article having excellent mechanical properties such as impact resistance. Another object of the present invention is to provide a thermoplastic resin composition containing this hitting sound reducing material.

Solution to Problem

The present inventor has found that a hitting sound reducing material composed of a specific (meth)acrylic acid ester polymer can solve the above problems.

The gist of the present invention is as follows.

[1] A hitting sound reducing material made of a (meth)acrylic acid ester polymer (B) comprising:
  a polymer (b1) comprising a structural unit derived from an acrylic ester compound and a structural unit derived from a methacrylic ester compound, and having a glass transition temperature of −15° C. to +5° C.; and
  a polymer (b2) comprising at least one selected from the group consisting of a structural unit derived from a methacrylic acid ester compound, a structural unit derived from an aromatic vinyl compound, and a structural unit derived from a vinyl cyanide compound,
  wherein the polymer (b1) has a temperature (peak temperature) indicating a peak value of a main dispersion of tan δ measured by the following method of −5° C. to +20° C., and a peak intensity, which is a peak value of the intensity, of 2.055 or more.

<Method for Measuring Tanδ>

A sheet having a thickness of 1.0 to 1.1 mm is molded by a heat press at a set temperature of 150° C. using the polymer (b1), and a measurement sample is prepared by cutting out a piece having a length of 36 mm and width of 10 mm from the sheet.

Using the following dynamic viscoelasticity measurement device, 8 mm portions of each long side of the measurement sample are fixed with a tension jig, tan δ is measured under the following conditions, and the peak temperature and peak intensity are determined.

Measuring device: Dynamic viscoelasticity measuring device ("DMA850" manufactured by TA Instruments Com.)
Mode: Tension
Frequency: 1 Hz
Heating rate: 5° C./min
Measurement temperature: −60 to +60° C.

[2] The hitting sound reducing material according to [1], wherein the (meth)acrylic acid ester polymer (B) has a swelling degree of THF-insoluble component of 1000% or more as measured by the following method.

<Method for Measuring Swelling Degree>

After immersing the (meth)acrylic acid ester polymer (B) in tetrahydrofuran (THF) for 24 hours, the insoluble component separated through a centrifugal separation operation is vacuum-dried and its weight (weight b) is measured.

After immersing the obtained THF-insoluble component in THF again for 24 hours, the weight (weight c) of the sample swollen with THF is measured, and the swelling degree of the THF-insoluble component is determined by the following formula.

Swelling degree (%)=$c/b$×100

[3] A thermoplastic resin composition comprising a resin component (A) containing a rubber-reinforced styrenic thermoplastic resin (A1) and the hitting sound reducing material according to [1] or [2].

[4] The thermoplastic resin composition according to [3], wherein the thermoplastic resin composition contains 95 to 70 parts by mass of the resin component (A) and 5 to 30 parts by mass of the hitting sound reducing material (wherein, the total of the resin component (A) and the hitting sound reducing material is 100 parts by mass).

Advantageous Effects of Invention

According to the present invention, it is possible to provide a thermoplastic resin molded article that suppresses the generation of hitting sounds and has excellent mechanical properties such as impact resistance and rigidity.

A hitting sound reducing material composed of a specific (meth)acrylic acid ester polymer (B) according to the present invention not only suppresses hitting sounds but also effectively functions to maintain the mechanical properties of the molded article obtained. By blending the hitting sound reducing material of the present invention with a resin component (A) containing a rubber-reinforced styrene thermoplastic resin (A1), not only hitting sounds but also squeaking sounds can be suppressed.

In the molded article obtained from the thermoplastic resin composition of the present invention, the (meth)acrylic acid ester polymer (B) that functions as a hitting sound reducing material also functions as a constituent component of the thermoplastic resin composition. Therefore, this molded article not only has acoustic properties in which hitting and squeaking sounds are suppressed, but also has excellent mechanical strength such as impact resistance and rigidity.

Therefore, according to the present invention, an article having low hitting sound and high impact resistance is provided.

In particular, by forming at least the contact portion of an article comprising at least two parts that may come into contact with each other intermittently due to vibration or the like, with the thermoplastic resin composition of the present invention, the mechanical strength is sufficiently maintained, and it is possible to provide an article that suppresses hitting sounds and squeak sounds and is made quiet or muffled.

"Vibration damping", which has been studied up to date, relates to the vibrations that occur continuously in an object when the object is subjected to continuous vibrations. On the other hand, "hitting sound" refers to the vibration that occurs instantaneously when an object collides with another object.

The time for absorbing and dispersing energy is completely different between the two.

In order to suppress hitting sounds, the energy absorption and dispersion speed needs to be extremely instantaneous.

"Vibration damping" concerns vibration noise caused by continuous vibration. On the other hand, "hitting sound" refers to the sound caused by a momentary impact. In this respect, the two are different.

BRIEF DESCRIPTION OF DRAWINGS

FIG. 1 is a perspective view of a test specimen used in a measurement of a sound pressure in Examples.

DESCRIPTION OF EMBODIMENTS

Embodiments of the present invention will be described in detail below.

In the present invention, "(co)polymerization" means "homopolymerization and/or copolymerization", "(meth)acrylic" means "acrylic and/or methacrylic", and "(meth)acrylate" means "acrylate and/or methacrylate".

"Structural unit" means a structural part contained in a polymer and derived from a compound (monomer, ie, monomer) before polymerization. The content ratio of the structural units derived from each compound in the polymer corresponds to the content ratio of the compound in the raw material monomer mixture used for producing the polymer.

[Hitting Sound Reducing Material]

The hitting sound reducing material of the present invention is characterized by being made of a (meth)acrylic acid ester polymer (B) (hereinafter sometimes referred to as "(meth)acrylic acid ester polymer (B) of the present invention") comprising:

a polymer (b1) comprising a structural unit derived from an acrylic ester compound (hereinafter sometimes simply referred to as "acrylic ester unit") and a structural unit derived from a methacrylic ester compound (hereinafter sometimes simply referred to as "methacrylic ester unit"), and having a glass transition temperature of −15° C. to +5° C.; and a polymer (b2) comprising at least one selected from the group consisting of a structural unit derived from a methacrylic acid ester compound (methacrylic acid ester unit), a structural unit derived from an aromatic vinyl compound (hereinafter sometimes simply referred to as "aromatic vinyl unit"), and a structural unit derived from a vinyl cyanide compound (hereinafter sometimes simply referred to as "vinyl cyanide unit"), wherein the polymer (b1) has a temperature (peak temperature) indicating a peak value of a main dispersion of tan δ measured by the following method of −5° C. to +20° C., and a peak intensity, which is a peak value of the intensity, of 2.055 or more.

<Method for Measuring Tanδ>

A sheet having a thickness of 1.0 to 1.1 mm is molded by a heat press at a set temperature of 150° C. using the polymer (b1), and a measurement sample is prepared by cutting out a piece having a length of 36 mm and width of 10 mm from the sheet.

Using the following dynamic viscoelasticity measurement device, 8 mm portions of each long side of the measurement sample are fixed with a tension jig, tan δ is measured under the following conditions, and the peak temperature and peak intensity are determined.

Measuring device: Dynamic viscoelasticity measuring device ("DMA850" manufactured by TA Instruments Com.)
Mode: Tension
Frequency: 1 Hz
Heating rate: 5° C./min
Measurement temperature: −60 to +60° C.

[Mechanism]

Since the polymer (b1) contained in the (meth)acrylic acid ester polymer (B) of the present invention contains an acrylic acid ester unit and a methacrylic acid ester unit, noise such as hitting sound can be suppressed. This is thought to be due to the structural units of polar monomers such as methyl methacrylate converting noise such as hitting sound into heat.

Further, since the glass transition temperature of the polymer (b1) containing acrylic ester units and methacrylic ester units is −15° C. to +5° C., noise such as hitting sound can be suppressed in the room temperature range.

Further, since the temperature (peak temperature) indicating the peak value of the main dispersion of tan δ measured for this polymer (b1) is −5° C. to +20° C., and the peak intensity, which is the peak value, is 2.055 or more, an excellent hitting sound reduction effect can be obtained.

Furthermore, by comprising the polymer (b2) containing the above specific structural unit, mechanical properties such as impact resistance can be exhibited.

[Relationship Between Polymer (b1) and Polymer (b2)]

There is no particular restriction on the form in which the polymer (b1) and the polymer (b2) exist in the (meth)acrylic acid ester polymer (B) of the present invention. However, it is preferable that a graft copolymer in which the polymer (b2) corresponding to the resin portion is bonded to at least a part of the polymer (b1) corresponding to the rubbery portion by graft polymerization or the like, since it is effective in improving an impact resistance.

In other words, in the (meth)acrylic acid ester polymer (B), it is preferable that at least a portion of the polymer (b2) is bonded to at least a portion of the polymer (b1) by graft polymerization or the like.

Therefore, the (meth)acrylic acid ester polymer (B) is preferably composed of at least a graft copolymer in which at least a part of the polymer (b2) is grafted to at least a part of the polymer (b1), and a (co)polymer constituting the polymer (b2) which has not been graft-polymerized to the polymer (b1). The (meth)acrylic acid ester polymer (B) may further contain a polymer (b1) to which the polymer (b2) is not grafted. The (meth)acrylic acid ester polymer (B) may further contain other components such as additives.

[Polymer (b1)]
<Structural Unit>

The polymer (b1) according to the present invention includes an acrylic ester unit and a methacrylic ester unit.

Regarding the content ratio of acrylic ester units and methacrylic ester units contained in the polymer (b1), from the viewpoint of adjusting the glass transition temperature, it is preferable that the content ratio of acrylic ester units is high. From the viewpoint of the hitting sound suppressing effect, it is preferable that the content of methacrylic acid ester units is high.

From this viewpoint, the content of the acrylic ester units in the total 100 parts by mass of acrylic ester units and methacrylic ester units contained in the polymer (b1) preferably 57 to 72 parts by mass, and the content of the methacrylic ester units is preferably 43 to 28 parts by mass, and more preferably 61 to 70 parts by mass of the acrylic ester units, and 39 to 30 parts by mass of the methacrylic ester units.

The polymer (b1) may contain structural units other than the acrylic ester units and the methacrylic ester units as long as the object of the present invention is not impaired. Examples of such structural units include structural units derived from crosslinking agents described below.

When the polymer (b1) contains a structural unit derived from a crosslinking agent, appearance properties such as gloss are improved. However, when the content of the structural unit derived from the crosslinking agent is high, the swelling degree of the obtained (meth)acrylic acid ester polymer (B) becomes small, and the effect as a hitting sound reducing material is impaired.

Therefore, when the polymer (b1) contains a structural unit derived from a crosslinking agent, the content thereof is preferably 0.4 parts by mass or less, and particularly preferably 0.10 to 0.25 parts by mass in 100 parts by mass of the polymer (b1).

The polymer (b1) may contain structural units derived from vinyl compounds other than acrylic ester units and methacrylic ester units. Examples of such vinyl compounds include aromatic vinyl compounds and vinyl cyanide compounds exemplified in the explanation of the rubber-reinforced styrene thermoplastic resin (A1) described below. However, from the viewpoint of more effectively obtaining the above-mentioned effects due to the polymer (b1) containing acrylic ester units and methacrylic ester units, when the polymer (b1) contains structural units derived from other vinyl compounds, its content is preferably 20 parts by mass or less, and particularly preferably 0 to 10 parts by mass in 100 parts by mass of the polymer (b1).

The acrylic ester compound constituting the acrylic ester unit is preferably an acrylic ester compound in which the alkyl group has 1 to 8 carbon atoms. Among them, ethyl acrylate, n-butyl acrylate, and n-ethylhexyl acrylate are preferred, and butyl acrylate is more preferred, because the thermoplastic resin composition containing the obtained (meth)acrylic acid ester polymer (B) has an excellent impact resistance. -Butyl acrylate is more preferred.

These acrylic acid alkyl ester compounds may be used alone or in combination of two or more.

The methacrylic ester compound constituting the methacrylic ester unit is preferably a methacrylic ester compound in which the alkyl group has 1 to 8 carbon atoms. Among them, methyl methacrylate, ethyl methacrylate, n-propyl methacrylate, isopropyl methacrylate, n-butyl methacrylate and isobutyl methacrylate are preferred, and methyl methacrylate is more preferred, because the thermoplastic resin composition containing the obtained (meth)acrylic acid ester polymer (B) has an excellent hitting sound reduction effect.

These methacrylic acid ester compounds may be used alone or in combination of two or more.

Examples of a crosslinking agent include allyl (meth) acrylate, butylene di(meth)acrylate, ethylene glycol di(meth)acrylate, propylene glycol di(meth)acrylate, 1,3-butanediol di(meth)acrylate, 1,4-butylene glycol di(meth)acrylate, polyethylene glycol di(meth)acrylate, polypropylene glycol di(meth)acrylate, polybutylene glycol di(meth)acrylate, polyester di(meth)acrylate, polyurethane di(meth)acrylate, polybutadiene di(meth)acrylate, divinylbenzene, trivinylbenzene, triallyl cyanurate, triallyl isocyanurate, trimethylolpropane diallyl ether, pentaerythritol triallyl ether, diallyldimethylammonium chloride, polyglycerin poly(meth)acrylate, and the like.

These may be used alone or in combination of two or more.

<Method for Producing Polymer (b1)>

The polymer (b1) can be produced in accordance with a conventional method using a monomer mixture containing an acrylic ester compound, a methacrylic ester compound, a crosslinking agent and other vinyl compounds used as necessary, so that the above-mentioned suitable proportions of each structural unit.

The method for producing the polymer (b1) is not particularly limited. Examples of the method for producing the polymer (b1) include a method of emulsion polymerization of a monomer mixture containing an acrylic ester compound, a methacrylic ester compound, and a crosslinking agent and other vinyl compounds used as necessary.

Examples of the method for the producing the polymer (b1) by emulsion polymerization include a method in which an acrylic ester compound, a methacrylic ester compound, a crosslinking agent and other vinyl compounds used as necessary (hereinafter, sometimes referred to as "raw material monomer mixture"), and a radical initiator are added to an aqueous solvent and copolymerized in the presence of an emulsifying agent.

The radical initiator, the raw material monomer mixture, and the crosslinking agent may be added all at once, added in portions, or added continuously.

Examples of an emulsifying agent include carboxylic acid emulsifying agent s such as alkali metal salts of oleic acid, palmitic acid, stearic acid, and rosin acid, and alkali metal salts of alkenylsuccinic acid, and the like; anionic emulsifying agent selected from alkyl sulfate, sodium alkylbenzenesulfonate, sodium alkylsulfosuccinate, sodium polyoxyethylene nonylphenylethersulfate, and the like. These known emulsifying agent can be used alone or in combination of two or more.

The amount of the emulsifying agent used is preferably 0.01 to 3.0 parts by mass and is more preferably 0.05 to 2.0 parts by mass relative to 100 parts by mass of the raw material monomer mixture, in order to readily control the particle size of the polymer (b1).

The initiator used in the production of the polymer (b1) is a radical polymerization initiator for radical polymerization, and its type is not particularly limited. Examples of the initiator include an azo polymerization initiator, a photopolymerization initiator, an inorganic peroxide, an organic peroxide, and a redox initiator that includes an organic peroxide, a transition metal, and a reductant. Among these, an azo polymerization initiator, an inorganic peroxide, an organic peroxide, and a redox initiator, which initiates polymerization upon being heated, are preferable. The above polymerization initiators may be used alone or in combination of two or more.

Examples of the azo polymerization initiator include 2,2'-azobis(4-methoxy-2,4-dimethylvaleronitrile), 2,2'-azobis(2,4-dimethylvaleronitrile), 2,2'-azobisisobutyronitrile, 2,2'-azobis(2-methylbutyronitrile), 1,1'-azobis(cyclohexane-1-carbonitrile), 1-[(1-cyano-1-methylethyl)azo]formamide, 4,4'-azobis(4-cyanovaleric acid), dimethyl 2,2'-azobis(2-methylpropionate), dimethyl 1,1'-azobis(1-cyclohexanecarboxylate), 2,2'-azobis[2-methyl-N-(2-hydroxyethyl)propionamide], 2,2'-azobis(N-butyl-2-methylpropionamide), 2,2'-azobis(N-cyclohexyl-2-methylpropionamide), 2,2'-azobis[2-(2-imidazolin-2-yl) propane], and 2,2'-azobis(2,4,4-trimethylpentane).

Examples of the inorganic peroxide include potassium persulfate, sodium persulfate, ammonium persulfate, and hydrogen peroxide.

Examples of the organic peroxide include peroxy esters. Specific examples thereof include α,α'-bis(neodecanoylperoxy)diisopropylbenzene, cumyl peroxyneodecanoate, 1,1,3,3-tetramethylbutyl peroxyneodecanoate, 1-cyclohexyl-1-methylethyl peroxyneodecanoate, t-hexyl peroxyneodecanoate, t-butyl peroxyneodecanoate, t-hexyl peroxypivalate, t-butyl peroxypivalate, 1,1,3,3-tetramethylbutyl peroxy-2-ethylhexanoate, 2,5-dimethyl-2,5-bis(2-ethylhexanoyl peroxy)hexane, 1-cyclohexyl-1-methylethyl peroxy-2-ethylhexanoate, t-hexyl peroxy 2-hexylhexanoate, t-butyl peroxy 2-hexylhexanoate, t-butyl peroxyisobutyrate, t-hexyl peroxy isopropyl monocarbonate, t-butyl peroxymaleic acid, t-butyl peroxy 3,5,5-trimethylhexanoate, t-butyl peroxylaurate, 2,5-dimethyl-2,5-bis(m-toluoyl peroxy) hexane, t-butyl peroxy isopropyl monocarbonate, t-butyl peroxy 2-ethylhexyl monocarbonate, t-hexyl peroxybenzoate, 2,5-dimethyl-2,5-bis(benzoyl peroxy)hexane, t-butyl peroxyacetate, t-butyl peroxy-m-toluoyl benzoate, t-butyl peroxybenzoate, bis(t-butylperoxy)isophthalate, 1,1-bis(t-hexylperoxy)3,3,5-trimethylcyclohexane, 1,1-bis(t-hexylperoxy)cyclohexane, 1,1-bis(t-butylperoxy)3,3,5-trimethylcyclohexane, 1,1-bis(t-butylperoxy)cyclohexane, 1,1-bis(t-butylperoxy)cyclododecane, 2,2-bis(t-butylperoxy)butane, n-butyl 4,4-bis(t-butylperoxy)valerate, 2,2-bis(4,4-di-t-butylperoxycyclohexyl)propane, α,α'-bis(t-butylperoxide) diisopropylbenzene, dicumyl peroxide, 2,5-dimethyl-2,5-bis (t-butylperoxy)hexane, t-butyl cumyl peroxide, di-t-butyl peroxide, cumene hydroperoxide, diisopropylbenzene hydroperoxide, dilauroyl peroxide, diisononanoyl peroxide, t-butyl hydroperoxide, benzoyl peroxide, lauroyl peroxide, dimethyl bis(t-butylperoxy)-3-hexyne, bis(t-butylperoxy isopropyl)benzene, bis (t-butylperoxy)trimethylcyclohexane, butyl-bis (t-butylperoxy)valerate, t-butyl 2-ethylhexane peroxide, dibenzoyl peroxide, para-menthane hydroperoxide, and t-butyl peroxybenzoate.

The redox initiator preferably includes an organic peroxide, ferrous sulfate, a chelating agent, and a reductant. Examples of such a redox initiator include a redox initiator including cumene hydroperoxide, ferrous sulfate, sodium pyrophosphate, and dextrose; and a redox initiator including t-butyl hydroperoxide, sodium formaldehyde sulfoxylate (Rongalite), ferrous sulfate, and disodium ethylenediaminetetraacetate.

The amount of the initiator added is usually 5 parts by mass or less, preferably 3 parts by mass or less, for example 0.001 to 3 parts by mass, based on a total of 100 parts by mass of the raw material monomer mixture.

The emulsion polymerization is usually carried out at 40 to 100° C. for about 30 to 600 minutes.

<Glass Transition Temperature of Polymer (b1)>

The glass transition temperature of the polymer (b1) according to the present invention is characterized in that it is within the range of −15° C. to +5° C. When the glass transition temperature is lower than −15° C. or higher than +5° C., an excellent hitting sound reduction effect cannot be obtained. From the viewpoint of excellent hitting sound reduction effect, the glass transition temperature of the polymer (b1) is preferably −10° C. to 0° C., and particularly preferably −7° C. to 0° C.

In order to produce the polymer (b1) having a glass transition temperature within the above range, the ratio of acrylic ester and methacrylic ester may be adjusted.

The glass transition temperature of the polymer (b1) is measured by the method described in the Examples secting below.

<Tan δ of Polymer (b1)>

Regarding the polymer (b1) according to the present invention, the temperature (peak temperature) indicating the peak value of the main dispersion of tan δ measured by the following method is −5° C. to +20° C., and the peak intensity, which is the peak value, is 2.055 or more.

<Method for Measuring Tanδ>

A sheet having a thickness of 1.0 to 1.1 mm is molded by a heat press at a set temperature of 150° C. using the polymer (b1), and a measurement sample is prepared by cutting out a piece having a length of 36 mm and width of 10 mm from the sheet.

Using the following dynamic viscoelasticity measurement device, 8 mm portions of each long side of the measurement sample are fixed with a tension jig, tan δ is measured under the following conditions, and the peak temperature and peak intensity are determined.

Measuring device: Dynamic viscoelasticity measuring device ("DMA850" manufactured by TA Instruments Com.)
Mode: Tension
Frequency: 1 Hz
Heating rate: 5° C./min
Measurement temperature: −60 to +60° C.

When the peak temperature of the polymer (b1) is between −5° C. and +20° C., the hitting sound reduction effect is excellent. From this viewpoint, the peak temperature of the polymer (b1) is preferably 0 to +20° C., and particularly preferably 0 to +15° C.

When the peak intensity of the polymer (b1) is 2.055 or more, hitting sounds can be suppressed more effectively. From this viewpoint, the peak intensity of the polymer (b1) is more preferably 2.07 or more, particularly preferably 2.09 or more. There is no particular restriction on the upper limit of the peak intensity, but it is usually 3 or less.

In order to produce the polymer (b1) that satisfies such the peak temperature and the peak intensity of tan δ, it is sufficient to select the optimal monomer constituting the polymer (b1) and adjust the amount of the crosslinking agent.

[Polymer (b2)]

<Structural Unit>

The polymer (b2) is a polymer (b2) containing one or more types selected from the group consisting of a structural unit derived from a methacrylic acid ester compound (methacrylic acid ester unit), a structural unit derived from an aromatic vinyl compound (aromatic vinyl unit), and a structural unit derived from a vinyl cyanide compound (vinyl cyanide unit).

Examples of combinations of structural units contained in the polymer (b2) include the following 1) to 5), but are not limited to the following.

1) A methacrylic acid ester unit alone
2) A methacrylic acid ester unit and an aromatic vinyl unit
3) A methacrylic acid ester unit and a vinyl cyanide unit
4) An aromatic vinyl unit and a cyanide vinyl units
5) A methacrylic acid ester unit, an aromatic vinyl unit, and a cyanide vinyl unit Among these, in particular, from the viewpoint of achieving both hitting sound reduction properties and physical properties, 4) those containing an aromatic vinyl unit and a vinyl cyanide unit, and 5) those containing a methacrylic acid ester unit, an aromatic vinyl unit, and a vinyl cyanide unit are preferred.

In the case of the combination 2) above, the content ratio of the methacrylic acid ester unit is preferably 95 to 60 parts by mass and the content ratio of the aromatic vinyl unit is preferably 5 to 40 parts by mass based on the total 100 parts by mass of the methacrylic acid ester unit and the aromatic vinyl unit, from the viewpoint of a hitting sound reduction effect.

In the case of the combination 3) above, the content ratio of the methacrylic acid ester unit is preferably 95 to 60 parts by mass and the content ratio of the vinyl cyanide unit is preferably 5 to 40 parts by mass based on the total of 100 parts by mass of the methacrylic acid ester unit and the vinyl cyanide unit, from the viewpoint of a hitting sound reduction effect.

In the case of the combination 4) above, the content ratio of the aromatic vinyl unit is preferably 95 to 60 parts by mass and the content ratio of the vinyl cyanide unit is preferably 5 to 40 parts by mass based on the total of 100 parts by mass of the aromatic vinyl unit and the vinyl cyanide unit from the viewpoint of an impact resistance.

In the case of the combination 5) above, the content of the methacrylic ester unit is preferably 60 to 80 parts by mass, the content of the aromatic vinyl unit is preferably 35 to 15 parts by mass, and the content of the vinyl cyanide unit is preferably 25 to 5 parts by mass based on the total of 100 parts by mass of the methacrylic ester unit, the aromatic vinyl unit, and the vinyl cyanide unit from the viewpoint of a hitting sound reduction effect and an impact resistance.

The polymer (b2) may contain structural units derived from vinyl compounds other than aromatic vinyl units, vinyl cyanide units, and alkyl methacrylate units, as long as the object of the present invention is not impaired. However, in order to more effectively obtain the effects of containing aromatic vinyl units, vinyl cyanide units, and alkyl methacrylate units, the content of structural units derived from other vinyl compounds in 100 parts by mass of polymer (b2) is preferably 20 parts by mass or less, and particularly preferably 0 to 10 parts by mass.

Examples of the aromatic vinyl compound constituting the aromatic vinyl unit of the polymer (b2) include styrene, α-methylstyrene, o-, m- or p-methylstyrene, vinylxylene, p-t-butylstyrene, ethylstyrene, and the like. Among these, styrene is preferred from the viewpoint of increasing the impact resistance of the resulting molded article.

These aromatic vinyl compounds may be used alone or in combination of two or more.

Examples of the vinyl cyanide compound constituting the vinyl cyanide unit of the polymer (b2) include acrylonitrile, methacrylonitrile, and the like. Among these, acrylonitrile is preferred from the viewpoint of increasing the impact resistance of the resulting molded article.

These vinyl cyanide compounds may be used alone or in combination of two or more.

The methacrylic acid ester compound constituting the alkyl methacrylate unit of the polymer (b2) is preferably a methacrylic ester compound in which the alkyl group has 1 to 8 carbon atoms. Among them, methyl methacrylate, ethyl methacrylate, n-propyl methacrylate, isopropyl methacrylate, n-butyl methacrylate and isobutyl methacrylate are preferred, and methyl methacrylate is more preferred.

These methacrylic acid ester compounds may be used alone or in combination of two or more.

Other vinyl compounds constituting the other vinyl compound units include vinyl compounds other than the aromatic vinyl compounds, vinyl cyanide compounds, and methacrylic acid ester compounds used in the production of the rubber-reinforced styrene thermoplastic resin (A1) described below.

<Method for Producing Polymer (b2)>

Preferably, the polymer (b2) can be produced by polymerization a raw material monomer mixture containing one or more of aromatic vinyl compounds, vinyl cyanide compounds, and methacrylic acid ester compounds, and other vinyl compounds used as necessary, in the presence of the polymer (b1), similar to the polymerization method of the vinyl monomer (a1) to the rubbery polymer (g) in the rubber-reinforced styrenic thermoplastic resin (A1) described below.

[(Meth)acrylic Acid Ester Polymer (B)]

<Content Ratio of Polymer (b1) and Polymer (b2)>

As described above, the (meth)acrylic acid ester polymer (B) of the present invention is produced by polymerizing one or more of aromatic vinyl compounds, vinyl cyanide compounds, methacrylic acid ester compounds and other vinyl compounds used as necessary constituting the polymer (b2) in the presence of the polymer (b1). By this method, it is possible to obtain a (meth)acrylic acid ester polymer (B) which is a graft copolymer in which at least a part of the polymer (b2) is graft-copolymerized to at least a part of the polymer (b1).

The (meth)acrylic acid ester polymer (B) may be included a polymer (b2) which is not graft-polymerized to the polymer (b1), and a polymer (b1) in which the polymer (b2) is not graft-polymerized.

Regarding the content ratio of polymer (b1) and polymer (b2) in the (meth)acrylic acid ester polymer (B), when the content ratio of the polymer (b1) is too high, the hitting sound reduction property will be improved, but other mechanical properties may deteriorate or producing difficulties may occur. On the other hand, when the content of the polymer (b1) is too low, there is a risk that the polymer (b1) will not be sufficiently effective in suppressing hitting sounds when mixed with the resin component (A) described below as a hitting sound reducing material.

From this viewpoint, the ratio of the polymer (b1) to the polymer (b2) contained in the (meth)acrylic acid ester polymer (B) is preferably 70 to 20 parts by mass of the polymer (b1) to 30 to 80 parts by mass of the polymer (b2) (with the proviso that the total of the polymer (b1) and the polymer (b2) is 100 parts by mass), and more preferably 40 to 70 parts by mass of the polymer (b1) and 60 to 30 parts by mass of polymer (b2).

<Swelling Degree of THF-insoluble Component>

The swelling degree of the THF-insoluble component of the (meth)acrylic acid ester polymer (B) of the present invention (hereinafter sometimes simply referred to as "swelling degree") measured by the following method is preferably 1000% or more.

The fact that the swelling degree of the (meth)acrylic acid ester polymer (B) of the present invention consisting of the polymer (b1) and the polymer (b2) is 1000% or more means that the the polymer (b1) contained in the (meth)acrylic acid ester polymer (B) has a large molecular weight between crosslinking points and is easily swollen. When the polymer (b1) is easily swollen, the molecular chain movement is less inhibited by crosslinking and exhibits an extremely excellent hitting sound reduction effect.

From the viewpoint of the hitting sound reduction effect, the swelling degree of the (meth)acrylic acid ester polymer (B) is more preferably 1200% or more, and even more preferably 1300% or more. On the other hand, there is no particular restriction on the upper limit of the swelling degree, but in order to improve the appearance, the swelling degree of the (meth)acrylic acid ester polymer (B) is preferably 1200 to 3000%, and more preferably, 1300 to 3000%.

<Method for Measuring Swelling Degree>

After immersing the (meth)acrylic acid ester polymer (B) in tetrahydrofuran (THF) for 24 hours, the insoluble component separated through a centrifugal separation operation is vacuum-dried and its weight (weight b) is measured.

After immersing the obtained THF-insoluble component in THF again for 24 hours, the weight (weight c) of the sample swollen with THF is measured, and the swelling degree of the THF-insoluble component is determined by the following formula.

$$\text{Swelling degree } (\%) = c/b \times 100$$

In order to produce the (meth)acrylic acid ester polymer (B) that satisfies such swelling degree, a crosslinking agent must not be used in the production of the polymer (b1), or even when a crosslinking agent is used, the amount of a crosslinking agent used is 0.4 parts by mass or less, particularly 0 to 0.25 parts by mass, in 100 parts by mass of polymer (b1), to reduced a crosslinked structure in the polymer (b1).

<Gel Content>

The gel content of the (meth)acrylic acid ester polymer (B) of the present invention is preferably 90% or less, and particularly preferably 88% or less. When the gel content is 90% or less, the hitting sound reduction effect is excellent. On the other hand, from the viewpoint of appearance properties such as gloss, the gel content is preferably 75% or more.

In order to produce the (meth)acrylic acid ester polymer (B) having such a gel content, the amount of a crosslinking agent used during production of the polymer (b1) may be adjusted.

The gel content of the (meth)acrylic acid ester polymer (B) is measured by the method described in the Examples section below.

<Molecular Weight of Acetonitrile Soluble Component>

The weight average molecular weight of the acetonitrile-soluble component of the (meth)acrylic acid ester polymer (B) of the present invention (hereinafter sometimes referred to as "the molecular weight of the acetonitrile-soluble component") is preferably 50,000 to 80,000, and particularly preferably 55,000 to 70,000. When the molecular weight of the acetonitrile-soluble component of the (meth)acrylic acid ester polymer (B) is within the above range, an impact resistance will be excellent.

In order to produce the (meth)acrylic acid ester polymer (B) having such a molecular weight of the acetonitrile-soluble component, the amount of the chain transfer agent used during production of the polymer (b1) may be adjusted.

The molecular weight of the acetonitrile-soluble component of the (meth)acrylic ester polymer (B) is measured by the method described in the Examples section below.

<Grafting Ratio>

The grafting ratio of the (meth)acrylic acid ester polymer (B) of the present invention is preferably 35 to 120%, and particularly preferably 40 to 80%. When the grafting ratio is equal to or higher than the above lower limit, an impact resistance will be excellent. On the other hand, when the grafting ratio is equal to or lower that the above upper limit, a sufficient fluidity can be ensured for injection molding.

In order to produce the (meth)acrylic acid ester polymer (B) having such a grafting ratio, the amounts of the polymerization initiator and chain transfer agent during production of the polymer (b1) may be adjusted.

The grafting ratio of the (meth)acrylic acid ester polymer (B) is measured by the method described in the Examples section described later.

[Thermoplastic Resin Composition]

The thermoplastic resin composition of the present invention contains a resin component (A) containing a rubber-reinforced styrene-based thermoplastic resin (A1) and the hitting sound reducing material of the present invention.

The hitting sound reducing material of the present invention is made of the (meth)acrylic acid ester polymer (B) of the present invention described above.

The thermoplastic resin composition of the present invention may contain only one type of (meth)acrylic acid ester polymer (B) of the present invention described above as a hitting sound reducing material, or may contain two or more types.

The thermoplastic resin composition of the present invention preferably contains 95 to 70 parts by mass of the resin component (A) and 5 to 30 parts by mass of the hitting sound reducing material, based on the total of 100 parts by mass of the resin component (A) and the hitting sound reducing material. When the content of the resin component (A) is equal to or lower that the above upper limit and the content of the hitting sound reducing material is equal to or higher than the above lower limit, the hitting sound reducing effect is excellent. On the other hand, when the content of the resin component (A) is equal to or higher than the above lower limit and the content of the hitting sound reducing material is equal to or lower than the above upper limit, the original properties of the resin component (A) are fully exhibited. The thermoplastic resin composition of the present invention more preferably contains 95 to 80 parts by mass of the resin component (A) and 5 to 20 parts by mass of the hitting sound reducing material, based on a total of 100 parts by mass of the resin component (A) and the hitting sound reducing material.

When the resin component (A) of the thermoplastic resin composition of the present invention contains a rubber-reinforced styrenic thermoplastic resin (A1) and a styrenic resin (A2) described below, it is preferable to contain 95 to 70 parts by mass of the resin component (A) and 5 to 30 parts by mass of the hitting sound reducing material, based on the total of 100 parts by mass of the resin component (A) and the hitting sound reducing material. It is more preferable to contain 90 to 70 parts by mass of the resin component (A) and 10 to 30 parts by mass of the hitting sound reducing material, based on the total of 100 parts by mass of the resin component (A) and the hitting sound reducing material. It is even more preferable to contain 90 to 75 parts by mass of the resin component (A) and 10 to 25 parts by mass of the hitting sound reducing material, based on the total of 100 parts by mass of the resin component (A) and the hitting sound reducing material.

When the resin component (A) of the thermoplastic resin composition of the present invention contains a rubber-reinforced styrenic thermoplastic resin (A1), a styrenic resin (A2), and an aromatic polycarbonate resin (A3) described below, it is preferable to contain 95 to 70 parts by mass of the resin component (A) and 5 to 30 parts by mass of the hitting sound reducing material, based on the total of 100 parts by mass of the resin component (A) and the hitting sound reducing material. It is more preferable to contain 95 to 80 parts by mass of the resin component (A) and 5 to 20 parts by mass of the hitting sound reducing material, based on the total of 100 parts by mass of the resin component (A) and the hitting sound reducing material. It is even more preferable to contain 95 to 85 parts by mass of the resin component (A) and 5 to 15 parts by mass of the hitting sound reducing material, based on the total of 100 parts by mass of the resin component (A) and the hitting sound reducing material.

[Resin Component (A)]

The thermoplastic resin composition of the present invention includes, as the resin component (A), at least the rubber-reinforced styrenic thermoplastic resin (A1). It is preferable that the thermoplastic resin composition further include a styrenic resin (A2) or include a styrenic resin (A2) and an aromatic polycarbonate resin (A3), together with the rubber-reinforced styrenic thermoplastic resin (A1).

The resin component (A) according to the present invention does not contain the (meth)acrylic acid ester polymer (B) of the above-mentioned hitting sound reducing material.

<Rubber-reinforced Styrenic Thermoplastic Resin (A1)>

The rubber-reinforced styrene thermoplastic resin (A1) contains a rubbery polymer portion and a vinyl copolymer portion. Such a rubber-reinforced styrenic thermoplastic resin (A1) can be produced by polymerizing a vinyl monomer (a1) such as an aromatic vinyl compound in the presence of a rubbery polymer (g). Details will be described later.

Examples of the rubbery polymer (g) include conjugated diene-based rubbers, such as polybutadiene, polyisoprene, butadiene-styrene copolymers, and butadiene-acrylonitrile copolymers; olefin-based rubbery polymer, that is an ethylene-α-olefin-based rubbery polymer, such as ethylene-propylene copolymers, ethylene-propylene-non-conjugated diene copolymers, ethylene-butene-1 copolymers, and ethylene-butene-1-non-conjugated diene copolymers; acrylic rubbers; silicone rubbers; polyurethane-based rubbers; silicone-acrylic IPN rubbers; natural rubbers; conjugated diene-based block copolymers; hydrogenated conjugated diene-based block copolymers; and the like. The preferred rubbery polymer (g) will be described later.

Among these, ethylene-α-olefin-based rubbery polymers are preferred as the rubbery polymer (g) because they are particularly effective in reducing both hitting and squeaking sounds. Among them, since it is effective for impact resistance, a rubber-reinforced styrene thermoplastic resin (A1) obtained by polymerizing a vinyl monomer (a1) containing an aromatic vinyl compound and a vinyl cyanide compound in the presence of an ethylene-α-olefin-based rubbery polymer is preferred. That is, it is preferably a rubber-reinforced styrene thermoplastic resin (A1) containing a rubbery polymer portion made of ethylene-α-olefin-based rubber, and a vinyl copolymer portion containing a structural unit derived from an aromatic vinyl compound and a structural unit derived from a vinyl cyanide compound.

The above-mentioned ethylene-α-olefin-based rubbery polymer is not particularly limited, and examples thereof include ethylene-α-olefin-based rubbery polymers containing ethylene and an α-olefin having 3 or more carbon atoms. A content of the ethylene is preferably 5 to 95 mass %, more preferably 50 to 90 mass %, and even more preferably 60 to 88 mass %, relative to a total mass of the monomers that form the ethylene-α-olefin-based rubbery polymer taken as 100 mass %.

Examples of the α-olefin having 3 or more carbon atoms include propylene, 1-butene, 2-butene, isobutene, 1-pentene, 2-methyl-1-butene, 2-methyl-2-butene, 3-methylbutene, 1-hexene, 4-methyl-1-pentene, 3-methyl-1-pentene, 1-heptene, 1-octene, 1-decene, and 1-undecene. These α-olefins may be present alone or in a combination of two or more. Among these α-olefins, propylene and 1-butene are preferable.

A content of the α-olefin is preferably 95 to 5 mass %, more preferably 50 to 10 mass %, and particularly preferably 40 to 12 mass %, relative to the total mass of the monomers that form the ethylene-α-olefin-based rubbery polymer taken as 100 mass %.

The ethylene-α-olefin-based rubbery polymer may be a binary copolymer formed of ethylene and an α-olefin or may be a polymer formed of the binary copolymer and one or more other compounds (e.g., a ternary copolymer or a quaternary copolymer). Examples of the one or more other compounds include non-conjugated diene compounds.

Examples of non-conjugated diene compounds that can be used in the ethylene-α-olefin-based rubbery polymers include alkenyl norbornenes, cyclic dienes, and aliphatic dienes. Dicyclopentadiene and 5-ethylidene-2-norbornene are preferable. These non-conjugated diene compounds may be used alone or in a combination of two or more. A content of the non-conjugated diene compound unit in the ethylene-α-olefin-based rubbery polymer is typically less than 30 mass % and preferably less than 15 mass %.

The acrylic rubbers are not particularly limited, and preferred examples thereof include (co)polymers of a (meth)acrylic acid alkyl ester compound in which the alkyl group has 1 to 8 carbon atoms and further include copolymers of the (meth)acrylic acid alkyl ester compound and a vinylic monomer copolymerizable with the (meth)acrylic acid alkyl ester compound.

Specific examples of acrylic acid alkyl ester compounds in which the alkyl group has 1 to 8 carbon atoms include methyl acrylate, ethyl acrylate, propyl acrylate, n-butyl acrylate, i-butyl acrylate, amyl acrylate, hexyl acrylate, n-octyl acrylate, 2-ethylhexyl acrylate, and cyclohexyl acrylate. Specific examples of methacrylic acid alkyl ester compounds in which the alkyl group has 1 to 8 carbon atoms include methyl methacrylate, ethyl methacrylate, propyl methacrylate, n-butyl methacrylate, i-butyl methacrylate, amyl methacrylate, hexyl methacrylate, n-octyl methacrylate, 2-ethylhexyl methacrylate, and cyclohexyl methacrylate. Among these compounds, n-butyl acrylate and 2-ethylhexyl acrylate are preferable. These may be used alone or in a combination of two or more.

Examples of the above vinylic monomer copolymerizable with the (meth)acrylic acid alkyl ester compound include polyfunctional vinyl compounds, aromatic vinyl compounds, and vinyl cyanide compounds.

The polyfunctional vinyl compounds are monomers having two or more vinyl groups per molecule of the monomer. The polyfunctional vinyl compounds have a function of crosslinking a (meth)acrylic rubber and serve as a reaction initiation site for graft polymerization. Specific examples of polyfunctional vinyl monomers include polyfunctional aromatic vinyl compounds, such as divinylbenzene and divinyltoluene; (meth)acrylic acid esters of a polyhydric alcohol, such as (poly)ethylene glycol dimethacrylate and trimethylolpropane triacrylate; diallyl maleate, diallyl fumarate, triallyl cyanurate, triallyl cyanurate, diallyl phthalate, and allyl methacrylate. These polyfunctional vinyl compounds may be used alone or in a combination of two or more.

The aromatic vinyl compounds and the vinyl cyanide compounds may be any of the compounds mentioned later. Furthermore, examples of other copolymerizable monomers include acrylamides, methacrylamides, vinylidene chloride, alkyl vinyl ethers in which the alkyl group has 1 to 6 carbon atoms, (meth)acrylic acid alkyl esters in which the alkyl group has 9 or more carbon atoms, and (meth)acrylic acids. These are used alone or in a combination of two or more.

A preferred monomer composition of the acrylic rubber is as follows: a (meth)acrylic acid alkyl ester compound unit in which the alkyl group has 1 to 8 carbon atoms is present in an amount of 80 to 99.99 mass % or more preferably 90 to 99.95 mass %, a polyfunctional vinyl compound unit is present in an amount of 0.01 to 5 mass % or more preferably 0.05 to 2.5 mass %, and a different vinyl monomer unit copolymerizable with this is present in an amount of 0 to 20 mass % or more preferably 0 to 10 mass %. The total percentage of the monomer composition is 100 mass %.

A volume average particle diameter of the acrylic rubber is preferably 50 to 1,000 nm, more preferably 50 to 700 nm, and particularly preferably 50 to 500 nm.

Specific examples of the conjugated diene-based block copolymer include copolymers including at least one of block A or block C and including at least one of block B or block A/B; and polymers of block B or block A/B. These blocks are described below. These can be produced with an anionic polymerization method known in the art. Examples of the method include the methods disclosed in JP 47-28915 B, JP 47-3252 B, JP 48-2423 B, and JP 48-20038 B.

The specific structure of the conjugated diene-based block copolymer includes structures shown in the following formulas (1) to (13), when each block A, B, A/B, and C are defined as follows.

A: aromatic vinyl compound polymer block
B: conjugated diene polymer block
A/B: aromatic vinyl compound/conjugated diene random copolymer block
C: tapered block formed of a copolymer of a conjugated diene and an aromatic vinyl compound, with an amount of the aromatic vinyl compound gradually increasing

A-B (1)
A-B-A (2)
A-B-C(3)
A-B1-B2 (4)

(Here, B1 is a conjugated diene polymer block or a conjugated diene-aromatic vinyl compound copolymer block, with the conjugated diene portion preferably having a vinyl bond content of greater than or equal to 20%, B2 is a conjugated diene polymer block or a conjugated diene-aromatic vinyl compound copolymer block, with the conjugated diene portion preferably having a vinyl bond content of less than 20%).

A-A/B (5)
A-A/B-C(6)
A-A/B-B (7)
A-A/B-A (8)
B2-B1-B2 (9) (Here, B1 and B2 are as described above).
C-B (10)

C-B-C (11)
C-A/B-C (12)
C-A-B (13)

The conjugated diene-based block copolymer may be a copolymer in which any of these basic backbones is repeatedly present or may be a conjugated diene-based block copolymer obtained by subjecting the copolymer to coupling.

A copolymer having the structure of formula (4) is shown in JP 2-133406 A. Copolymers having the structure of formula (5) or the structure of formula (6) are shown in JP 2-305814 A and JP 3-72512 A.

Examples of the conjugated diene to be used include 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene, and chloroprene. The conjugated diene may be 1,3-butadiene, isoprene, or 1,3-pentadiene. This is preferable in terms of industrial availability and for obtaining a conjugated diene-based block copolymer having excellent physical properties. More preferably, the conjugated diene is 1,3-butadiene.

Examples of the aromatic vinyl compound to be used include styrene, t-butylstyrene, α-methylstyrene, p-methylstyrene, hydroxystyrene, vinylxylene, monochlorostyrene, dichlorostyrene, monobromostyrene, dibromostyrene, fluorostyrene, p-t-butylstyrene, ethylstyrene, vinyl naphthalene, divinylbenzene, 1,1-diphenylstyrene, N,N-diethyl-p-aminoethylstyrene, N,N-diethyl-p-aminoethylstyrene, and vinylpyridine. Preferably, the aromatic vinyl compound is styrene or α-methylstyrene, and particularly preferably, styrene.

In the conjugated diene-based block copolymer, a ratio of the aromatic vinyl compound/the conjugated diene, on a mass basis, may be 0 to 70/100 to 30. The ratio is preferably 0 to 60/100 to 40 and more preferably 0 to 50/100 to 50. In instances where the aromatic vinyl compound is used as an essential component, the ratio of the aromatic vinyl compound/the conjugated diene is preferably 10 to 70/90 to 30. When the content of the aromatic vinyl compound is greater than 70 mass %, the copolymer is in the form of a resin. As a result, the effect thereof as the rubber component is poor, and, therefore, such a content is not preferable.

In the conjugated diene block, the vinyl bond content of the conjugated diene portion is typically within a range of 5 to 80%.

A number average molecular weight of the conjugated diene-based block copolymer is usually 10,000 to 1,000,000, preferably 20,000 to 500,000, and more preferably 20,000 to 200,000.

In the above structural formulae, it is preferable that a number average molecular weight of the A portion be within a range of 3,000 to 150,000. And it is preferable that a number average molecular weight of the B portion be within a range of 5,000 to 200,000.

The number average molecular weights are values measured by gel permeation chromatography (GPC).

The vinyl bond content of the conjugated diene compound can be adjusted with one or more substances, examples of which include amines, such as N,N,N',N'-tetramethylethylenediamine, trimethylamine, triethylamine, and diazocyclo(2,2,2)octaamine; ethers, such as tetrahydrofuran, diethylene glycol dimethyl ether, and diethylene glycol dibutyl ether; thioethers; phosphines; phosphoamides; alkyl benzene sulfonic acid salts; alkoxides of potassium or sodium; and the like.

Examples of the coupling agent that is used in the present invention include diethyl adipate, divinylbenzene, methyl-dichlorosilane, silicon tetrachloride, butyltrichlorosilicon, tetrachlorotin, butyltrichlorotin, dimethylchlorosilicon, tetrachlorogermanium, 1,2-dibromoethane, 1,4-chloromethylbenzene, bis(trichlorosilyl)ethane, epoxidized linseed oils, tolylene diisocyanates, 1,2,4-benzene triisocyanate, and the like.

The hydrogenated conjugated diene-based block copolymer is a hydrogenated product that is a partially hydrogenated product or a completely hydrogenated product of the conjugated diene-based block copolymer, in which at least 30%, or preferably at least 50%, of the carbon-to-carbon double bonds of the conjugated diene portion is hydrogenated, or more preferably at least 90% thereof is hydrogenated.

The hydrogenation reaction of the conjugated diene-based block copolymer can be carried out with a method known in the art. By adjusting the degree of hydrogenation with a method known in the art, a target hydrogenated conjugated diene-based block copolymer can be obtained. Specific examples of the method include the methods disclosed in JP S42-8704 B, JP S43-6636 B, JP S63-4841 B, JP S63-5401 B, JP H2-133406 A, and JP H1-297413 A.

The rubbery polymer (g) used in the present invention preferably has a gel content of 70% by mass or more from the viewpoint of mechanical properties such as impact resistance and rigidity, and appearance such as gloss. The gel content of the rubbery polymer (g) is more preferably 80% by mass or more, and even more preferably 90% by mass or more.

Here, the gel content can be determined according to the method described below. 1 g of the rubbery polymer (g) is added to 100 ml of toluene, which is then allowed to stand at room temperature for 48 hours. Subsequently, a toluene-insoluble residue is filtered off with a 100-mesh wire sieve (a mass of the wire sieve is designated as W1 grams), and then, the toluene-insoluble residue and the wire sieve are dried under vacuum at a temperature of 80° C. for 6 hours and thereafter weighed (the mass is designated as W2 grams). W1 and W2 are substituted into equation (i) below to determine the gel content. Some ethylene-propylene-based rubbery polymers have ethylene crystallinity, and in instances where such a rubbery polymer is used, the rubbery polymer is to be dissolved at a temperature of 80° C. so that the gel content can be determined.

$$\text{Gel content} = [[W2(g) - W1(g)]/1(g)] \times 100 \quad (i)$$

The gel content can be adjusted by appropriately specifying a type and an amount of use of a crosslinkable monomer, a type and an amount of use of a molecular weight regulator, a polymerization time, a polymerization temperature, a polymerization conversion ratio, and the like, for the production of the rubbery polymer (g).

Among the rubbery polymers (g) used in the present invention, preferred among those mentioned above are polybutadiene, a butadiene-styrene copolymer, ethylene-α-olefin-based rubbery polymer such as an ethylene-propylene copolymer, an ethylene-propylene-non-conjugated diene copolymer, an acrylic rubber, a silicone rubber, a conjugated diene-based block copolymer, or a hydrogenated conjugated diene-based block copolymer. More preferably, the rubbery polymer (g) is ethylene-α-olefin-based rubbery polymer such as an ethylene-propylene copolymer, an ethylene-propylene-non-conjugated diene copolymer, an acrylic rubber, a conjugated diene-based block copolymer, or a hydrogenated conjugated diene-based block copolymer. Particularly preferably, the rubbery polymer (g) is an acrylic rubber, an ethylene-propylene copolymer, an ethylene-propylene-non-conjugated diene copolymer, a conjugated diene-based block copolymer, or a hydrogenated conjugated diene-based block copolymer. Most preferably, the rubbery polymer (g) is an ethylene-propylene copolymer.

The rubbery polymer (g) can be produced with a method known in the art, examples of which include emulsion polymerization, solution polymerization, bulk polymerization, and suspension polymerization. Regarding acrylic rubbers, those produced by emulsion polymerization, among these methods, are preferable. Regarding ethylene-propylene copolymers, ethylene-propylene-non-conjugated diene copolymers, conjugated diene-based block copolymers, and hydrogenated conjugated diene-based block copolymers, those produced by solution polymerization are preferable.

Regarding polybutadiene and butadiene-styrene copolymers, those produced by solution polymerization are preferable.

The rubber-reinforced styrenic thermoplastic resin (A1) can be obtained by polymerizing an aromatic vinyl compound or polymerizing an aromatic vinyl compound with a different vinyl monomer (a1) copolymerizable with the aromatic vinyl compound, in the presence of the rubbery polymer (g). That is, one or more vinyl monomers (a1) may be an aromatic vinyl compound alone or a mixture of an aromatic vinyl compound and a different vinyl monomer copolymerizable with the aromatic vinyl compound.

It is preferable that the rubber-reinforced styrenic thermoplastic resin (A1) be one obtained by polymerizing an aromatic vinyl compound or polymerizing an aromatic vinyl compound with a different vinyl monomer (a1) copolymerizable with the aromatic vinyl compound, in the presence of the rubbery polymer (g), where the one or more vinyl monomers (a1) is in an amount of 20 to 97 parts by mass, and the rubbery polymer (g) is in an amount of 3 to 80 parts by mass (provided that the sum of the mass of the rubbery polymer (g) and the mass of the one or more vinyl monomers (a1) is 100 parts by mass). More preferably, the proportion of the rubbery polymer (g) is 7 to 65 parts by mass, and the proportion of the one or more vinyl monomers (a1) is 35 to 93 parts by mass.

Examples of the aromatic vinyl compound to be used include all the compounds mentioned above for the aromatic vinyl compound polymer block A of the conjugated diene-based block copolymer. Particularly preferably, the aromatic vinyl compound is styrene or α-methylstyrene. These may be used alone or in a combination of two or more.

Examples of the different vinyl monomer copolymerizable with the aromatic vinyl compound include vinyl cyanide compounds, (meth)acrylic acid ester compounds, maleimide compounds, and other unsaturated compounds containing one or more functional groups. Examples of the other unsaturated compounds containing one or more functional groups include unsaturated acid compounds, epoxy-group-containing unsaturated compounds, hydroxy-group-containing unsaturated compounds, acid-anhydride-group-containing unsaturated compounds, oxazoline-group-containing unsaturated compounds, and substituted or unsubstituted amino-group-containing unsaturated compounds. These different vinyl monomers may be used alone or in a combination of two or more.

Examples of the vinyl cyanide compounds include acrylonitriles and methacrylonitriles. These may be used alone or in a combination of two or more. In the instance where a vinyl cyanide compound is used, chemical resistance is imparted. An amount of use of the vinyl cyanide compound is typically 0 to 60 mass % and preferably 5 to 50 mass %, relative to a total mass of the one or more vinyl monomers (a1).

Examples of the (meth)acrylic acid ester compounds include methyl acrylate, ethyl acrylate, butyl acrylate, methyl methacrylate, ethyl methacrylate, and butyl methacrylate. These may be used alone or in a combination of two or more. In the instance where a (meth)acrylic acid ester compound is used, surface hardness is improved. An amount of use of the (meth)acrylic acid ester compound is typically 0 to 80 mass % relative to the total mass of the one or more vinyl monomers (a1).

Examples of the maleimide compounds include maleimides, N-phenylmaleimide, N-cyclohexylmaleimide, N-methylmaleimide, N-benzylmaleimide, and the like. These may be used alone or in a combination of two or more. The introduction of the maleimide unit may be carried out by copolymerizing a maleic anhydride and subsequently performing imidization. In the instance where a maleimide compound is used, heat resistance is imparted. An amount of use of the maleimide compound is typically 1 to 60 mass % relative to the total mass of the one or more vinyl monomers (a1).

Examples of the unsaturated acid compounds include acrylic acid, methacrylic acid, ethacrylic acid, maleic acid, fumaric acid, itaconic acid, crotonic acid, and cinnamic acid. These may be used alone or in a combination of two or more.

Examples of the epoxy group containing unsaturated compounds include glycidyl acrylate, glycidyl methacrylate, and allyl glycidyl ether. These may be used alone or in a combination of two or more.

Examples of the hydroxy group containing unsaturated compounds include 3-hydroxy-1-propene, 4-hydroxy-1-butene, cis-4-hydroxy-2-butene, trans-4-hydroxy-2-butene, 3-hydroxy-3-methyl-1-propene, 2-hydroxyethyl methacrylate, 2-hydroxyethyl acrylate, and N-(4-hydroxyphenyl)maleimide. These may be used alone or in a combination of two or more.

Examples of the oxazoline group containing unsaturated compounds include vinyl oxazoline. These may be used alone or in a combination of two or more.

Examples of the acid anhydride group containing unsaturated compounds include maleic anhydride, itaconic anhydride, and citraconic anhydride. These may be used alone or in a combination of two or more.

Examples of the substituted or unsubstituted amino-group-containing unsaturated compounds include aminoethyl acrylate, propylaminoethyl acrylate, dimethylaminoethyl methacrylate, phenylaminoethyl methacrylate, N-vinyl diethylamine, N-acetyl vinylamine, acrylamine, N-methylacrylamine, acrylamide, N-methylacrylamide, and p-aminostyrene. These may be used alone or in a combination of two or more.

In instances where one or more other unsaturated compounds containing one or more functional groups are used, one possibility is that, for the blending of the rubber-reinforced styrenic thermoplastic resin (A1) with the styrenic resin (A2) and the aromatic polycarbonate resin (A3), compatibility between these may be improved. An amount of use of the other unsaturated compounds containing one or more functional groups is typically 0.1 to 20 mass % and preferably 0.1 to 10 mass %, relative to a total mass of the rubber-reinforced styrenic thermoplastic resin (A1) and the styrenic resin (A2). The amount of use is the total amount of unsaturated compounds containing a functional group that are used.

In the one or more vinyl monomers (a1), an amount of use of one or more monomers other than the aromatic vinyl compound is typically less than or equal to 80 mass %, preferably less than or equal to 60 mass %, and even more preferably less than or equal to 50 mass %, relative to the total mass of the one or more vinyl monomers (a1) taken as 100 mass %.

Examples of preferred combinations of monomers that form the one or more vinyl monomers (a1) include styrene alone, styrene/acrylonitrile, styrene/methyl methacrylate, styrene/acrylonitrile/methyl methacrylate, styrene/acrylonitrile/glycidyl methacrylate, styrene/acrylonitrile/2-hydroxyethyl methacrylate, styrene/acrylonitrile/(meth)acrylate, styrene/N-phenylmaleimide, and styrene/methyl methacrylate/cyclohexylmaleimide. Further preferred combinations are styrene alone, styrene/acrylonitrile (=65/45 to 90/10 (mass ratio)), styrene/methyl methacrylate (=80/20 to 20/80 (mass ratio)), and styrene/acrylonitrile/methyl methacrylate (where the styrene content is any amount within a range of 20 to 80 mass %, and a total content of acrylonitrile and methyl methacrylate is any amount within a range of 20 to 80 mass %).

The rubber-reinforced styrenic thermoplastic resin (A1) can be produced with a polymerization method known in the art, examples of which include emulsion polymerization, bulk polymerization, solution polymerization, suspension polymerization, and combinations of any of these. Regarding the polymerization method, in instances where the rubbery polymer (g) is derived from emulsion polymerization, the production of the rubber-reinforced styrenic thermoplastic resin (A1) may also be carried out by emulsion polymerization. In instances where the rubbery polymer (g) is derived from solution polymerization, the production of the rubber-reinforced styrenic thermoplastic resin (A1) is typically and preferably carried out by bulk polymerization, solution polymerization, or suspension polymerization.

However, even in instances where the rubbery polymer (g) is produced by solution polymerization, the production of the rubber-reinforced styrenic thermoplastic resin (A1) can be carried out by emulsion polymerization, which can be performed by emulsifying the rubbery polymer (g) by using a method known in the art. Even in instances where the rubbery polymer (g) is produced by emulsion polymerization, the production of the rubber-reinforced styrenic thermoplastic resin (A1) can be carried out by bulk polymerization, solution polymerization, or suspension polymerization, which can be performed after the rubbery polymer (g) is coagulated and isolated.

In instances where emulsion polymerization is used for the production, any of the following is used: a polymerization initiator, a chain transfer agent, an emulsifying agent, and the like. All of these may be ones known in the art.

Examples of the polymerization initiator include cumene hydroperoxide, p-menthane hydroperoxide, diisopropylbenzene hydroperoxide, tetramethylbutyl hydroperoxide, tert-butyl hydroperoxide, potassium persulfate, and azobisisobutyronitrile. It is preferable to use a redox system as an auxiliary polymerization initiator, and the redox system may include those that use any of various types of reduction agents, saccharated iron pyrophosphate, sulfoxylate, and the like.

Examples of the chain transfer agent include octyl mercaptans, n-dodecyl mercaptans, t-dodecyl mercaptans, n-hexyl mercaptans, and terpinolenes.

Examples of the emulsifying agent that may be used include alkyl benzene sulfonic acid salts, such as sodium dodecylbenzene sulfonate; aliphatic sulfonic acid salts, such as sodium lauryl sulfate; higher fatty acid salts, such as potassium laurate, potassium stearate, potassium oleate, and potassium palmitate; and rosin acid salts, such as potassium rosinate.

In the emulsion polymerization, the manner of using the rubbery polymer (g) and the one or more vinyl monomers (a1) may be as follows. In the presence of the total amount of the rubbery polymer (g), the one or more vinyl monomers (a1) may be added at one time for polymerization or added in portions or continuously for polymerization. It is also possible to add a portion of the rubbery polymer (g) during the polymerization.

After the emulsion polymerization, the obtained latex is typically coagulated with a coagulating agent. Subsequently, the resultant is washed with water and dried to give a powder of the rubber-reinforced styrenic thermoplastic resin (A1). In this instance, the coagulation may be performed after two or more types of latices of the rubber-reinforced styrenic thermoplastic resin (A1) obtained in the emulsion polymerization are appropriately blended together.

The coagulation may be performed after a latex of the styrenic resin (A2) is appropriately blended.

Examples of the coagulating agent that may be used include inorganic salts, such as calcium chloride, magnesium sulfate, and magnesium chloride; and acids, such as sulfuric acid, acetic acid, citric acid, and malic acid.

It is also possible to obtain a powder of the rubber-reinforced styrenic thermoplastic resin (A1) by atomizing and drying the latex.

In instances where the rubber-reinforced styrenic thermoplastic resin (A1) is produced by solution polymerization, solvents that may be used are inert polymerization solvents that are used in typical radical polymerization. Examples of the solvent include aromatic hydrocarbons, such as ethyl benzene and toluene; ketones, such as methyl ethyl ketone and acetone; acetonitrile; dimethylformamide; and N-methylpyrrolidone.

The polymerization temperature is typically within a range of 80 to 140° C. and preferably 85 to 120° C. For the polymerization, a polymerization initiator may be used, or the polymerization may be carried out by thermal polymerization without using a polymerization initiator.

Suitable examples of polymerization initiators that may be used include organic peroxides, such as ketone peroxides, dialkyl peroxides, diacyl peroxides, peroxyesters, hydroperoxides, azobisisobutyronitrile, and benzoyl peroxide.

In instances where a chain transfer agent is used, examples of chain transfer agents that may be used include mercaptans, terpinolenes, and α-methylstyrene dimers.

In instances where the rubber-reinforced styrenic thermoplastic resin (A1) is produced by bulk polymerization or suspension polymerization, any of the polymerization initiators, chain transfer agents, and the like described above for the solution polymerization may be used.

An amount of residual monomers in the rubber-reinforced styrenic thermoplastic resin (A1) produced by any of the above-mentioned polymerization methods is typically less than or equal to 10,000 ppm and preferably less than or equal to 5,000 ppm.

The rubber-reinforced styrenic thermoplastic resin (A1), which is obtained by polymerizing the one or more vinyl monomers (a1) in the presence of the rubbery polymer (g), includes a copolymer in which the one or more vinyl monomers (a1) is graft-copolymerized with the rubbery polymer (g) and includes a non-grafted component (a (co)

polymer of the one or more vinyl monomers (a1)) in which the one or more vinyl monomers (a1) is not grafted with the rubbery polymer (g).

Typically, the rubber-reinforced styrenic thermoplastic resin (A1) has a grafting ratio adjusted to be 5 to 100 mass %. The grafting ratio is preferably 10 to 90 mass %, more preferably 15 to 85 mass %, and particularly preferably 20 to 80%. The grafting ratio can be varied by varying one or more factors, examples of which include the type and the amount of use of the polymerization initiator, the type and the amount of use of the chain transfer agent, the polymerization method, the time of contact between the one or more vinyl monomers (a1) and the rubbery polymer (g) during polymerization, the type of the rubbery polymer (g), and the polymerization temperature.

The grafting ratio can be determined according to the equation (ii) below.

$$\text{Grafting ratio(mass \%)} = \{(T-S)/S\} \times 100 \qquad \text{(ii)}$$

In the equation (ii), T is a mass (g) of an insoluble fraction resulting from an operation performed as follows: 1 g of the rubber-reinforced styrenic thermoplastic resin (A1) is added to 20 ml of acetone, the resultant is shaken with a shaker for 2 hours, and subsequently, the resultant is centrifuged with a centrifuge (rotational speed: 32,000 rpm) for 60 minutes to separate a soluble fraction from the insoluble fraction.

S is a mass (g) of the rubbery polymer (g) present in 1 g of the rubber-reinforced styrenic thermoplastic resin (A1).

In instances where an aromatic vinyl compound alone is used as the one or more vinyl monomers (a1), methyl ethyl ketone is to be used instead of acetone for the measurement.

Typically, the acetone-soluble fraction of the rubber-reinforced styrenic thermoplastic resin (A1) has an intrinsic viscosity [TI] (measured at 30° C. in methyl ethyl ketone used as a solvent) of 0.15 to 1.2 dl/g. The intrinsic viscosity is preferably 0.2 to 1.0 dl/g and more preferably 0.2 to 0.8 dl/g.

Typically, the particles of the grafted rubbery polymer dispersed in the rubber-reinforced styrenic thermoplastic resin (A1) have an average particle diameter of 50 to 3,000 nm. The average particle diameter is preferably 50 to 2,500 nm and particularly preferably 50 to 2,000 nm. When the rubber particle diameter is less than 50 nm, it is likely that impact resistance is degraded. When the rubber particle diameter is greater than 3,000 nm, it is likely that the surface appearances of molded articles are degraded.

The rubber-reinforced styrenic thermoplastic resin (A1) can be prepared to have a transparency. This can be achieved by ensuring that the rubbery polymer (g) that is used and the copolymer of the one or more vinyl monomers (a1) have a substantially equal refractive index and/or ensuring that the particle diameter of the rubbery polymer (g) that is dispersed is substantially less than or equal to a wavelength of visible light (typically less than or equal to 1,500 nm). Such a transparent resin may also be used as the rubber-reinforced styrenic thermoplastic resin (A1) of the present invention.

One rubber-reinforced styrenic thermoplastic resin (A1) may be used alone, or two or more rubber-reinforced styrenic thermoplastic resins (A1) that are different in the copolymer composition, physical properties, and/or the like may be mixed together and used.

[Styrenic Resin (A2)]

The styrenic resin (A2) is a (co)polymer prepared by polymerizing an aromatic vinyl compound or polymerizing an aromatic vinyl compound with a different vinyl monomer (a2) copolymerizable with the aromatic vinyl compound. One or more vinyl monomers (a2) may be an aromatic vinyl compound alone or a mixture of an aromatic vinyl compound and a different vinyl monomer copolymerizable with the aromatic vinyl compound. Examples of the aromatic vinyl compound and the different vinyl monomer copolymerizable with the aromatic vinyl compound that are to be used include all the compounds mentioned above as the one or more vinyl monomers (a1) for the rubber-reinforced styrenic thermoplastic resin (A1).

The one or more vinyl monomers (a2) may be the same as or different from the one or more vinyl monomers (a1) described above.

In the one or more vinyl monomers (a2), a content of one or more monomers other than the aromatic vinyl compound is typically less than or equal to 80 mass %, preferably less than or equal to 60 mass %, and even more preferably less than or equal to 50 mass %, relative to a total mass of the one or more vinyl monomers (a2) taken as 100 mass %.

Preferred examples of the styrenic resin (A2) include homopolymers of styrene, styrene-acrylonitrile copolymers, styrene-methyl methacrylate copolymers, styrene-acrylonitrile-methyl methacrylate copolymers, styrene-maleimide compound copolymers, and copolymers of any of the foregoing compounds and any of the functional-group-containing unsaturated compounds mentioned above.

The styrenic resin (A2) can be produced with any of the polymerization methods known in the art, which include emulsion polymerization, bulk polymerization, solution polymerization, suspension polymerization, and a combination of any of these, as described above for the production method for the rubber-reinforced styrenic thermoplastic resin (A1).

One styrenic resin (A2) may be used alone, or two or more styrenic resins (A2) that are different in the copolymer composition, physical properties, and/or the like may be mixed together and used.

[Aromatic Polycarbonate Resin (A3)]

The aromatic polycarbonate resin (A3) may be any of aromatic polycarbonate resins derived from a polymerization method known in the art. Examples of the polymerization method include interfacial polycondensation between a dihydroxy aryl compound and phosgene and transesterification reactions (melt polycondensation) between a dihydroxy aryl compound and a carbonate compound, such as diphenyl carbonate.

Examples of the dihydroxy aryl compound include bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)propane, 2,2-bis(4-hydroxy-3-t-butylphenyl)propane, 2,2-bis (4-hydroxy-3-t-butylphenyl) propane, 1,1-bis (4-hydroxyphenyl)cyclopentane, 1,1-bis(4-hydroxyphenyl)cyclohexane, 4,4'-dihydroxyphenyl ether, 4,4'-dihydroxyphenyl sulfide, 4,4'-dihydroxyphenyl sulfone, 4,4'-dihydroxy-3,3'-dimethyl diphenyl sulfone, hydroquinone, and resorcinol. Further examples include polyorganosiloxanes having hydroxy-aryloxy terminal groups (see U.S. Pat. No. 3,419,634, for example). These may be used alone or in a combination of two or more. Among these, 2,2-bis(4-hydroxyphenyl propane (bisphenol A) is preferable.

A viscosity average molecular weight of the aromatic polycarbonate resin (A3) is preferably 12,000 to 40,000, more preferably 15,000 to 35,000, and particularly preferably 18,000 to 30,000. When the molecular weight is high, the resulting molded articles have a high mechanical strength; however, a decrease in flowability tends to degrade the appearance of the molded articles. The aromatic polycarbonate resin (A3) may be two or more aromatic polycarbonate-based resins having different molecular weights.

Typically, the viscosity average molecular weight of the aromatic polycarbonate resin (A3) can be calculated as follows. A specific viscosity (ηsp) of the aromatic polycarbonate resin (A3) is measured at 20° C. and a concentration of 0.7 g/100 ml (methylene chloride), with the methylene chloride being used as a solvent, and the specific viscosity (ηsp) is substituted into the following equation (iii).

$$\text{Viscosity average molecular weight} = ([\eta] \times 8130)^{1.205} \quad \text{(iii)}$$

In the equation, $[\eta]] = [(\eta sp \times 1.12 + 1)^{1/2} - 1]/0.56C$, where C is the concentration.

[Contents of Rubber-Reinforced Styrenic Thermoplastic Resin (A1) and Styrenic Resin (A2)]

In instances where the resin component (A) of the present invention includes the rubber-reinforced styrenic thermoplastic resin (A1) and the styrenic resin (A2), it is preferable that a content of the rubber-reinforced styrenic thermoplastic resin (A1) be 0.1 to 99 mass %, and a content of the styrenic resin (A2) be 1 to 99.9 mass %, relative to a mass of the resin component (A) taken as 100 mass %.

When the contents are within these ranges, good heat resistance and flowability are exhibited.

Regarding the content proportions of the rubber-reinforced styrenic thermoplastic resin (A1) and the styrenic resin (A2), it is more preferable that the rubber-reinforced styrenic thermoplastic resin (A1) be present in an amount of 1 to 80 mass %, and the styrenic resin (A2) in an amount of 20 to 99 mass %, and it is even more preferable that the rubber-reinforced styrenic thermoplastic resin (A1) be present in an amount of 5 to 60 mass %, and the styrenic resin (A2) in an amount of 40 to 95 mass %.

[Contents of Rubber-Reinforced Styrenic Thermoplastic Resin (A1), Styrenic Resin (A2), and Aromatic Polycarbonate Resin (A3)]

In instances where the resin component (A) of the present invention includes the rubber-reinforced styrenic thermoplastic resin (A1), the styrenic resin (A2), and the aromatic polycarbonate resin (A3), it is preferable that a content of the rubber-reinforced styrenic thermoplastic resin (A1) be 0.1 to 89 mass %, a content of the styrenic resin (A2) be 1 to 89.9 mass %, and a content of the aromatic polycarbonate resin (A3) be 10 to 98.9 mass %, relative to the mass of the resin component (A) taken as 100 mass %.

When the contents are within these ranges, better heat resistance and flowability are exhibited.

Regarding the content proportions of the rubber-reinforced styrenic thermoplastic resin (A1), the styrenic resin (A2), and the aromatic polycarbonate resin (A3), it is more preferable that the rubber-reinforced styrenic thermoplastic resin (A1) be present in an amount of 1 to 60 mass %, and the styrenic resin (A2) in an amount of 5 to 64 mass %, and the aromatic polycarbonate resin (A3) in an amount of 35 to 94 mass %, and it is even more preferable that the rubber-reinforced styrenic thermoplastic resin (A1) be present in an amount of 5 to 50 mass %, the styrenic resin (A2) in an amount of 8 to 55 mass %, and the aromatic polycarbonate resin (A3) in an amount of 40 to 87 mass %.

[Other Resins]

The resin component (A) of the present invention may include one or more other resins different from the rubber-reinforced styrenic thermoplastic resin (A1), the styrenic resin (A2), and the aromatic polycarbonate resin (A3), to an extent that does not compromise the object of the present invention.

Examples of the one or more other resins include polyolefin-based resins, vinyl chloride-based resins, acrylic resins, polyester-based resins, polyamide-based resins, polyacetal-based resins, polyphenylene-ether-based resins, and polyarylene-sulfide-based resins. These thermoplastic resins may be used alone or in a combination of two or more.

In instances where the thermoplastic resin composition of the present invention includes the one or more other resins, it is preferable that a content of the one or more other resins be less than or equal to 50 mass % relative to a mass of the resin component (A), including the rubber-reinforced styrenic thermoplastic resin (A1), the styrenic resin (A2), the aromatic polycarbonate resin (A3), and the one or more other resins, taken as 100 mass %. Particularly preferably, the content is less than or equal to 30 mass %.

[Other Components]

The thermoplastic resin composition of the present invention may include one or more other components different from the resin component (A) and the hitting sound reducing material (B), to an extent that does not compromise the object of the present invention.

[Slidability-imparting Agent]

The thermoplastic resin composition of the present invention may include a slidability-imparting agent. The slidability-imparting agent imparts slidability to the thermoplastic resin composition, thereby providing an effect of facilitating assembling of a product in which a molded article derived from the thermoplastic resin composition of the present invention is to be included and also providing an effect of inhibiting abnormal noises, such as squeaks, from being generated during use by the product including the molded article.

Representative examples of the slidability-imparting agent include low-molecular-weight oxidized polyethylene, ultra-high-molecular-weight polyethylene, and polytetrafluoroethylene, which are described in JP 2011-137066 A, and also include low-molecular-weight polyolefin waxes (e.g., those having a number average molecular weight of 10,000 or less) and silicone oils.

Preferred examples of the polyethylene waxes include a polyethylene wax having a melting point of 0 to 120° C. In instances where a polyolefin wax having such a melting point or a different additive having a melting point of 0 to 120° C. is added to the thermoplastic resin composition of the present invention, the effect of inhibiting the generation of abnormal noises such as squeaks can be produced even if the rubbery component of the rubber-reinforced styrenic thermoplastic resin (A1) has no melting point (Tm). These slidability-imparting agents may be used alone or in a combination of two or more.

In instances where a slidability-imparting agent is to be included in the thermoplastic resin composition of the present invention, it is preferable that an amount of inclusion of the slidability-imparting agent be 0.1 to 10 parts by mass per 100 parts by mass of the rubber-reinforced styrenic thermoplastic resin (A1).

<Heat Aging Inhibitor>

A heat aging inhibitor may be added to the thermoplastic resin composition of the present invention to obtain molded articles in which the generation of squeaks is inhibited and which have a high degree of surface gloss. The heat aging inhibitor is not particularly limited provided that the heat aging inhibitor is one that is included in rubber or the like. Preferred heat aging inhibitors are phenolic antioxidants and phosphorus-containing antioxidants.

Examples of the phenolic antioxidants include phenolic antioxidants containing a phenol group that has a t-butyl group in an ortho position, as represented by general formula (I) below.

[Chem. 1]

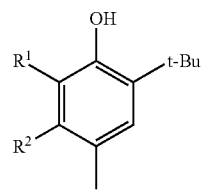

(I)

In the formula, $R^1$ and $R^2$ each independently represent a hydrogen atom or an alkyl group having 1 to 8 carbon atoms. t-Bu represents a t-butyl group.

In above general formula (I), preferably, the substituents $R^1$ and $R^2$ each independently represent a hydrogen atom, a t-butyl group, or a methyl group, and more preferably, a hydrogen atom or a methyl group; particularly preferably, $R^1$ is a hydrogen atom. Specifically, the phenolic antioxidant that is used in the present invention is preferably a compound containing one or more groups represented by general formula (I), shown above. More preferably, the phenolic antioxidant is a compound represented by one of the following formulae, (C1), (C2), and (C3).

[Chem. 2]

[Chem. 3]

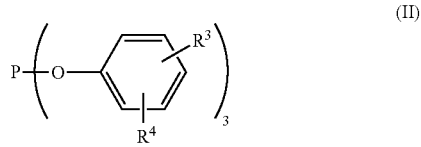

(II)

In the formula, $R^3$ and $R^4$ each independently represent a hydrogen atom or an alkyl group having 1 to 8 carbon atoms, and particularly preferably, $R^3$ and $R^4$ are a t-C4H9 group.

In instances where a heat aging inhibitor is to be included in the thermoplastic resin composition of the present invention, it is preferable that an amount of inclusion of the heat aging inhibitor is 0.01 to 5 parts by mass per 100 parts by mass of the thermoplastic resin composition of the present invention. More preferably, the amount is 0.02 to 3 parts by mass, even more preferably, 0.03 to 2 parts by mass, and particularly preferably, 0.03 to 1 part by mass. A most preferred range of the amount of inclusion of the heat aging inhibitor is 0.02 to 0.6 parts by mass, 0.02 to 0.2 parts by mass, 0.03 to 0.6 parts by mass, or 0.03 to 0.2 parts by mass. When the amount of inclusion of the heat aging inhibitor is within any of the above-mentioned ranges, the resulting molded articles have excellent gloss and a good appearance.

<Other Additives>

Examples of other additives that may be included in the thermoplastic resin composition of the present invention include antioxidants, UV absorbers, weathering agents, fill-

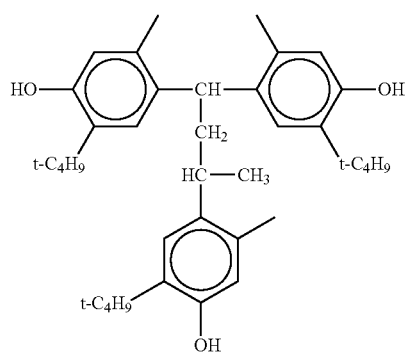

(C1)

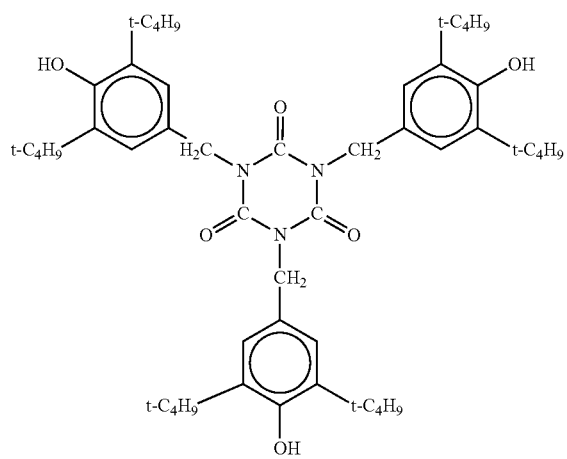

(C2)

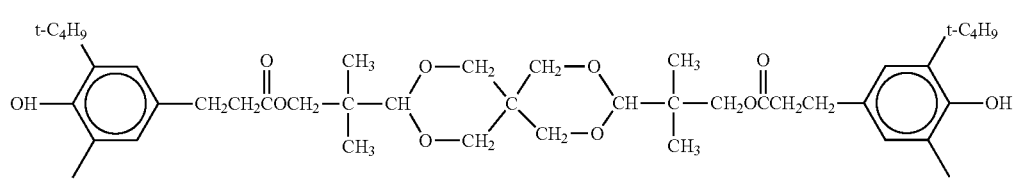

(C3)

Examples of the phosphorus-containing antioxidants include compounds represented by general formula (II) below.

ers, antistatic agents, flame-retardancy-imparting agents, antifogging agents, lubricants, antimicrobial agents, antifungal agents, tackifying agents, plasticizing agents, coloring agents, graphite, carbon black, carbon nanotubes, and pigments (including pigments with functionalities imparted thereto, examples of the functionalities including infrared absorption or reflection ability). These may be used alone or in a combination of two or more.

Typically, an amount of inclusion of the one or more additives is 0.1 to 30 parts by mass per 100 parts by mass of the resin component (A).

[Method for Producing Thermoplastic Resin Composition]

The thermoplastic resin composition of the present invention can be produced as follows. The components are mixed together at a predetermined compounding ratio with a tumbler mixer, a Henschel mixer, or the like, and subsequently, the mixture is melt-kneaded under appropriate conditions with a kneading machine, such as a single screw extruder, a twin screw extruder, a Banbury mixer, a kneader, a roller, or a feeder ruder. Preferably, the kneading machine is a twin screw extruder. Furthermore, for the kneading of the components, the components may be kneaded all together, or the components may be added in portions in multiple steps to be kneaded.

After the components are kneaded with a Banbury mixer, a kneader, or the like, the resultant may be pelletized with an extruder.

A temperature for the melt-kneading is typically 180 to 240° C. and preferably 190 to 230° C.

[Suitable Physical Properties and the Like]

Suitable physical properties and the like of the thermoplastic resin composition of the present invention will be described below. Specifically, the physical properties and the like described below of the thermoplastic resin composition of the present invention are measured with the methods described later in the Examples section.

<Maximum Value of Sound Pressure>

From the viewpoint of suppressing hitting sounds, it is preferably that the thermoplastic resin composition of the present invention has a maximum sound pressure of less than 68.9 dB in a thermoplastic resin composition not containing an aromatic polycarbonate resin (A3), and less than 70.5 dB in a thermoplastic resin composition containing an aromatic polycarbonate resin (A3), in the frequency range of 20 to 20,000 Hz when measured by the method described in the Examples section described later.

<Abnormal Noise Risk Value>

The thermoplastic resin composition of the present invention preferably has an abnormal noise risk value of 3 or less as measured by the method described in the Examples section described later.

<Mechanical Properties and Heat Resistance>

The thermoplastic resin composition of the present invention preferably maintains high mechanical strength and heat resistance. The thermoplastic resin composition of the present invention preferably has the following physical properties as measured by the methods described in the Examples section described later.

<Preferred Physical Properties of a Thermoplastic Resin Composition not containing Aromatic Polycarbonate Resin (A3)>

Charpy impact strength (23° C.): 8 kJ/m$^2$ or more
Tensile yield stress: 38 MPa or more
Bending strength: 58 MPa or more
Flexural modulus: 1850 MPa or more
Deflection temperature under load (1.8 MPa): 87° C. or higher
Rockwell hardness: 95 or more <Preferred Physical Properties of Thermoplastic Resin Composition containing Aromatic Polycarbonate Resin (A3)>

Charpy impact strength (23° C.): 50 kJ/m$^2$ or more
Charpy impact strength (−30° C.): 25 kJ/m$^2$ or more
Tensile yield stress: 42 MPa or more
Bending strength: 62 MPa or more
Flexural modulus: 1750 MPa or more
Deflection temperature under load (1.8 MPa): 100° C. or high
Rockwell hardness: 100 or more <Flowability>

When the thermoplastic resin composition of the present invention does not contain an aromatic polycarbonate resin (A3) as the resin component (A), an MVR measured by the method described in the Examples section described later is preferably 6 cm$^3$/10 min or more. When the thermoplastic resin composition of the present invention contains an aromatic polycarbonate resin (A3), an MVR measured by the method described in the Examples section described later is preferably 10 cm$^3$/10 min or more.

<Gloss>

The thermoplastic resin composition of the present invention preferably has a gloss of 88% or more, and particularly preferably has a gloss of 95% or more, as measured by the method described in the Examples section described later.

[Molded Article]

A molded article of the present invention can be produced by molding the thermoplastic resin composition by using a molding method known in the art, examples of which include injection molding, gas injection molding, press molding, sheet extrusion, vacuum molding, profile extrusion, foam molding, material extrusion and deposition, and selective laser sintering.

The thermoplastic resin composition of the present invention has excellent properties as described above. Molded articles of the present invention, which are molded from the thermoplastic resin composition of the present invention, can be used in vehicle interior and exterior articles. Examples of articles in which the thermoplastic resin composition can be used include vehicle interior articles, such as seat belt buckles, upper boxes, cup holders, door trims, door knobs, door pockets, door linings, pillar garnishes, consoles, console boxes, interior mirrors, sun visors, center panels, ventilators, air conditioners, air conditioner panels, heater control panels, plate-shaped wings, valve shutters, louvers, ducts, meter panels, meter cases, meter visors, instrument panel upper garnishes, instrument panel lower garnishes, A/T indicators, on/off switches (slide portions, slide plates), switch bezels, grille front defrosters, grille side defrosters, lid clusters, masks such as instrument panel lower covers (e.g., mask switches and mask radios), pockets (e.g., pocket decks and pocket cards), steering wheel horn pads, cup holders, switch components, switch boxes, grips such as assist grips, handles, grab handles, exterior components for car navigation, camera covers, camera monitoring systems, head-up displays, rear entertainment systems, glove boxes, glove box ratchets, small article containers, cap ratchets of small article containers or the like, interior mirrors, interior lamps, armrests, speaker grilles, navigation panels, overhead consoles, clock indicators, and SOS switches; vehicle exterior articles, such as front grilles, wheel caps, bumpers, fenders, spoilers, garnishes, door mirrors, radiator grilles, rear combination lamps, head lamps, turn lamps, and grips of outside door handles; exterior members such as a case or a housing for office machines or home appliances, interior members, components disposed near switches, components of movable parts, desk lock components, desk drawers, paper trays for copy machines, lighting apparatuses such as panels, covers, connectors, and the like for linear LED lamps, bulb-shaped LED lamps, bulb-type fluorescent lamps, or ceiling lights, home appliances such as cell phones, tablet computers, rice cookers, refrigerators, microwave ovens, gas cooking appliances, vacuum cleaners, dishwashers, air cleaners, air conditioners, heaters, TV sets, and recorders; office equipment, such as printers, FAX machines, copying machines, personal computers, and projectors; acoustic instruments such as audio devices, organs, and electric pianos, caps for cosmetic containers, and battery cell casings. In particular, the thermoplastic resin composition can be preferably used in vehicle interior articles.

The molded article of the present invention may be formed of one component or two or more components. The molded article of the present invention is suitable for use as a component of an article including at least two components that may come into contact with each other and may pose a risk of generating a hitting sound when the components come into contact with each other. For example, the present invention can provide an article including at least two components that may come into contact with each other, in which at least one of the components may come into contact with the other of the two components, and the other component has a portion that is at least partially formed of the thermoplastic resin composition of the present invention.

In other words, the present invention can provide an article including at least a first component and a second component that may come into contact with each other, in which a portion of the first component that may come into contact with the second component is at least partially formed of the thermoplastic resin composition of the present invention. In this instance, it is preferable that the entirety of the first component or a portion or the entirety of the portion of the first component that comes into contact with the second component be formed of the thermoplastic resin composition of the present invention.

The second component, with which the first component comes into contact, may be a component molded from the thermoplastic resin composition of the present invention, or the second component may be a component molded from a resin other than the thermoplastic resin composition of the present invention or may be a component made of a different material, such as a metal.

Examples of the resin other than the thermoplastic resin composition of the present invention include rubber-reinforced aromatic vinyl-based resins, such as polypropylene-based resins and ABS resins; acrylic resins, such as polymethylmethacrylate; polycarbonate resins; polycarbonate/ABS alloys; nylon resins; nylon/ABS alloys; PET resins; PET/ABS alloys; PBT/ABS alloys; thermoplastic elastomers; and thermosetting elastomers.

The article including at least a first component and a second component that may come into contact with each other is not particularly limited provided that the first and second components are components that may come into contact with each other as described above. An example of the article is an article in which the first and second components are disposed adjacent to each other with a space therebetween and intermittently come into contact with each other when an external force, such as vibration or an opening/closing operation, is applied. More specifically, the article may be an article in which the two components are fitted to each other with some play therebetween, that is, loosely fitted to each other. The manner in which the two components are fitted to each other is not particularly limited provided that the two components are loosely fitted to each other. For example, the two components may be snap-fitted, threadedly fitted, or engagingly fitted. Examples of such articles include opening/closing components (e.g., caps and doors) having a push-open configuration with a push latch or a magnet latch. More specific examples of such articles include, among vehicle interior articles, opening/closing parts, such as sunglass trays.

EXAMPLES

The present invention will now be described in further detail with reference to examples. The present invention is not limited to the examples described below. In the following description, "parts" and "%" are on a mass basis unless otherwise specified.

[Raw materials]

In the Examples and Comparative Examples described below, the raw materials used in the production of the thermoplastic resin composition were resin components produced in the following manner and commercial products, which are described below.

[Rubber-Reinforced Styrenic Thermoplastic Resin (A1)]

<Production of (A1-1)>

To a polymerization vessel equipped with a stirrer, 280 parts of water, 60 parts (on a solids basis) of polybutadiene latex, which was used as a diene-based rubbery polymer and had a weight average particle diameter of 0.26 µm and a gel content of 90%, 0.3 parts of sodium formaldehyde sulfoxylate, 0.0025 parts of iron (II) sulfate, and 0.01 parts of disodium ethylenediamine tetraacetate were added, and after deoxygenation, the ingredients were heated to 60° C. with stirring in a nitrogen stream. A mixture of monomers was continuously added dropwise to the resultant, at 60° C. for 5 hours. The monomers were 10 parts of acrylonitrile, 30 parts of styrene, 0.2 parts of t-dodecyl mercaptan, and 0.3 parts of cumene hydroperoxide. After completion of the dropwise addition, the resultant was stirred at a polymerization temperature of 65° C. for 1 hour, subsequently, the polymerization was terminated, and, accordingly, a latex of a graft copolymer was obtained. The degree of polymerization was 98%. Subsequently, 0.2 parts of 2,2'-methylene-bis (4-ethylene-6-t-butylphenol) was added to the obtained latex, which was then coagulated with an addition of calcium chloride. The resultant was subjected to processes of washing, filtration, and drying to give an ABS resin (A1-1), which was in the form of a powder. The obtained ABS resin (A1-1) had a grafting ratio of 40%, and its acetone-soluble fraction had an intrinsic viscosity [η] of 0.38 dl/g.

<Production of (A1-2)>

To a 20-L stainless steel autoclave equipped with a ribbon-type stirring blade, an auxiliary agent-continuous adding device, a thermometer, and the like, 22 parts of an ethylene-propylene copolymer (ethylene/propylene=78/22 (%), a Mooney viscosity ($ML_{1+4}$, 100° C.) of 20, a melting point (Tm) of 40° C., and a glass transition temperature (Tg) of −50° C.), which was used as an ethylene-α-olefin-based rubbery polymer, 55 parts of styrene, 23 parts of acrylonitrile, 0.5 parts of t-dodecyl mercaptan, and 110 parts of toluene were added. Thereafter, the contents in the autoclave were stirred at an internal temperature, which was increased to 75° C., for 1 hour to give a homogeneous solution.

Subsequently, 0.45 parts of t-butyl peroxyisopropylmonocarbonate was added, and the internal temperature was further increased. After the internal temperature reached 100° C., a polymerization reaction was carried out at a stirring speed of 100 rpm, with the temperature being maintained. When 4 hours had passed since the start of the polymerization reaction, the internal temperature was increased to 120° C., a reaction was carried out for another 2 hours, with the temperature being maintained, and the polymerization reaction was terminated. Subsequently, the internal temperature was reduced to 100° C., and 0.2 parts of octadecyl-3-(3,5-di-t-butyl-4-hydroxyphenol)propionate and 0.02 parts of a dimethyl silicone oil KF-96-100cST (trade name, manufactured by Shin-Etsu Silicones) were added. Subsequently, the reaction mixture was removed from the autoclave, and unreacted residues and the solvent were distilled off by steam distillation. Furthermore, the resultant was degassed by substantially removing the volatile portion with an extruder having a 40 mmφ vent (a cylinder temperature of 220° C. and a degree of vacuum of 760 mmHg). In this manner, the reaction mixture was pelletized. The obtained AES resin (A1-2) had a grafting ratio of 70%, and its acetone-soluble fraction had an intrinsic viscosity [η] of 0.47 dl/g.

[Styrenic Resin (A2)]

<Production of (A2-1)>

An AS resin (A2-1) was used, which was an acrylonitrile-styrene copolymer in which the proportions of the acrylonitrile units and the styrene units were 27% and 73%, respectively, an intrinsic viscosity [η] (in methyl ethyl ketone, 30° C.) was 0.47 dl/g, and the glass transition temperature (Tg) was 103° C.).

<Production of (A2-2)>

To a polymerization vessel equipped with a stirrer, 250 parts of water and 1.0 parts of sodium palmitate were added, and after deoxygenation, the ingredients were heated to 70° C. with stirring in a nitrogen stream. Furthermore, 0.4 parts of sodium formaldehyde sulfoxylate, 0.0025 parts of iron (II) sulfate, and 0.01 parts of disodium ethylenediamine tetraacetate were added. Subsequently, a mixture of monomers was continuously added dropwise at a polymerization temperature of 70° C. for 7 hours. The monomers were 70 parts of α-methylstyrene, 25 parts of acrylonitrile, 5 parts of styrene, 0.5 parts of t-dodecyl mercaptan, and 0.2 parts of cumene hydroperoxide. After completion of the dropwise addition, the mixture was stirred at a polymerization temperature of 75° C. for 1 hour, then, the polymerization was terminated, and, accordingly, a latex of a copolymer was obtained. The degree of polymerization was 99%. Subsequently, the obtained latex was coagulated with an addition of calcium chloride. The resultant was subjected to processes of washing, filtration, and drying to give a heat-resistant AS resin (A2-2), which was in the form of a powder. The intrinsic viscosity [II] of the acetone-soluble fraction of the obtained heat-resistant AS resin (A2-2) was 0.40 dl/g.

[Aromatic Polycarbonate Resin (A3)]

<(A3-1)>

A PC resin (A3-1) was used, which was an aromatic polycarbonate resin Novarex 7022J (trade name), manufactured by Mitsubishi Engineering-Plastics Corporation.

[Hitting Sound Reducing Material (B)]

The hitting sound reducing materials (B-1) to (B-16) respectively produced in Examples I-1 to I-16 described later or the hitting sound reduction materials (BX-1) to (BX-7) produced in Comparative Examples I-1 to I-7 produced were used as the hitting sound reducing materials (B).

The hitting sound reducing material (BX-8) of Comparative Example I-8 is the following commercial product.

<Hitting Sound Reduction Material (BX-8)>

A hydrogenated product of a styrene-butadiene copolymer S1605, manufactured by Asahi Kasei Corp. (a styrene content of 66%, and a degree of hydrogenation of 95%)

[Method for Measuring Polymer]

The methods for evaluating various physical properties and characteristics of the polymers in Examples and Comparative Examples are as follows.

[Glass Transition Temperature (Tg)]

In accordance with JIS K7121, using a differential scanning calorimeter ("Q200" manufactured by TA Instruments Com.) a DSC curve was measured under the conditions of raising the temperature once from −90° C. to 50° C. (1st run), then cooling it to −90° C., and then increasing the temperature from −90° C. to 50° C. at a rate of 10° C./min (2nd run). The midpoint glass transition temperature of the 2nd run determined from this DSC curve was defined as the glass transition temperature in the present invention.

[Weight Average Particle Diameter]

A weight average particle diameter was determined by the photon correlation method using "Microtrac Model: 9230UPA" manufactured by Nikkiso Co., Ltd.

[Tanδ Peak Intensity and Peak Temperature]

The latex of the polymer (b1) was coagulated and dried to obtain a sample of the polymer (b1). Next, a sheet having a thickness of 1.0 to 1.1 mm was molded by a heat press at a set temperature of 150° C. using the sample of the polymer (b1), and a measurement sample was prepared by cutting out a piece having a length of 36 mm and width of 10 mm from the sheet.

Using the following dynamic viscoelasticity measurement device, 8 mm portions of each long side of the measurement sample were fixed with a tension jig, tan δ was measured under the following conditions, and the peak temperature and peak intensity ware determined.

Measuring device: Dynamic viscoelasticity measuring device ("DMA850" manufactured by TA Instruments Com.)

Mode: Tension

Frequency: 1 Hz

Heating rate: 5° C./min

Measurement temperature: −60 to +60° C.

[Swelling Degree of THF-insoluble Component]

After immersing the (meth)acrylic acid ester polymer (B) in tetrahydrofuran (THF) for 24 hours, the insoluble matter separated through a centrifugal separation operation was vacuum-dried and its weight (weight b) was measured.

After immersing the obtained THF-insoluble component in THF again for 24 hours, the weight (weight c) of the sample swollen with THF was measured, and the swelling degree of the THF-insoluble component was determined by the following formula.

$$\text{Swelling degree (\%)} = c/b \times 100$$

The swelling degree here refers to the swelling degree of the graft structure contained in the (meth)acrylic acid ester polymer (B). However, when the graft structure does not have a crosslinked structure, it cannot be obtained as a THF-insoluble component. Since it is difficult to obtain an accurate swelling degree due to dissolution in THF, the swelling degree was determined to be 3000% or more when the gel content was 1% or less.

[Gel Content]

1 g of the (meth)acrylic acid ester polymer (B) was added to 100 ml of THF, which was then allowed to stand at room temperature for 48 hours. Subsequently, a THF-insoluble residue was filtered off with a 100-mesh wire sieve (a mass of the wire sieve was designated as W1 grams), and then, the THF-insoluble residue and the wire sieve ware dried under vacuum at a temperature of 80° C. for 6 hours and thereafter weighed (the mass was designated as W2 grams). W1 and W2 were substituted into the following formula (i) to determine the gel content.

$$\text{Gel content} = [[W2(g) - W1(g)]/1(g)] \times 100 \quad \text{(i)}$$

[Graft Ratio]1 g of the (meth)acrylic acid ester polymer (B) was added to 20 mL of acetonitrile, and the mixture was shaken for 2 hours using a shaker. The obtained suspended acetonitrile solution was centrifuged for 60 minutes using a centrifuge (rotation speed: 32,000 rpm) to separate a precipitate component (acetonitrile-insoluble component) and an acetonitrile solution (acetonitrile-soluble component). Then, the precipitated component (acetonitrile-insoluble component) was dried, its mass (T (g)) was measured, and the grafting ratio was calculated using the following formula.

$$\text{Grafting ratio(mass \%)} = \{(TS)/S\} \times 100$$

[Molecular Weight of Acetonitrile Soluble Component]

The weight-average molecular weight of the acetonitrile-soluble component obtained in the evaluation of the grafting ratio above, in terms of polystyrene, was measured by gel permeation chromatography under the conditions shown below. A calibration curve was created using standard polystyrene, and the weight-average molecular weight was determined calculated from the relationship between molecular weight and retention time.

Measuring device: "GPC-244" manufactured by Waters Corporation
Column: "TSK-gel-GMH" manufactured by Tosoh Corporation
Solvent: THF
Flow rate 0.8 mL/min
Measurement temperature: 23° C.

[Production of (R-1)]

A monomer mixture (I) was prepared by mixing 71.22 parts of n-butyl acrylate (hereinafter abbreviated as BA), 28.55 parts of methyl methacrylate (hereinafter abbreviated as MMA), and 0.23 parts of allyl methacrylate (hereinafter abbreviated as AMA) as a crosslinking agent.

In a 10L glass reactor equipped with a stirring device, a raw material and auxiliary agent adding device, a thermometer, a heating device, and the like, 220 parts of water and 0.1 part of sodium dodecylbenzenesulfonate as an emulsifying agent were charged, and the internal temperature was raised to 70° C. while stirring under a nitrogen stream. When the temperature reaches 70° C. 84% by mass of an aqueous solution (hereinafter abbreviated as RED aqueous solution) in which 0.01 parts of ethylenediaminetetraacetic acid tetrasodium dihydrate, 0.002 parts of ferrous sulfate heptahydrate, and 0.3 parts of sodium formaldehyde sulfoxylate was dissolved in 8.5 parts of water was charged into the reactor. Immediately thereafter, 100 parts of the monomer mixture (I) and 0.2 parts of cumene hydroperoxide were continuously added over 3 hours. One hour after the start of the dropwise addition, an aqueous solution of 1.6 parts of dodecylbenzenesulfonic acid dissolved in 20 parts of water was charged into the reactor. Immediately after completing the continuous addition of the monomer mixture (I), the remaining 16% by mass of the RED aqueous solution and 0.005 parts of cumene hydroperoxide were charged into the reactor, and the internal temperature of the reactor was maintained at 70° C. for an additional 30 minutes. After that, the polymerization reaction was completed and an acrylic rubbery polymer (R-1) latex was obtained.

The polymerization conversion rate at this time was 97%.

The weight average particle diameter of the obtained acrylic rubbery polymer (R-1) particles measured by the method described above was 150 nm.

The glass transition temperature (Tg) of the film obtained by drying this acrylic rubbery polymer (R-1) latex was measured by the method described above.

In addition, the peak intensity and peak temperature of tanδ were measured using the method described above.

The results are shown in Table 1A.

[Production of (R-2) to (R-12) and (RX-1) to (RX-9)]

Acrylic rubber polymers (R-2) to (R-12) and (RX-1) to (RX −9) were produced in the same manner as (R-1) except that the formulations shown in Tables 1A and 1B were used, respectively.

However, by adjusting the amount of sodium dodecylbenzenesulfonate used at the start of polymerization within the range of 0.10 to 0.33 parts, the acrylic rubbery polymers having the weight average particle diameters shown in Tables 1A and 1B were obtained.

The measurement results of the weight average particle diameter, Tg, and peak intensity, and peak temperature of tanδ of these acrylic rubbery polymers are shown in Tables 1A and 1B.

Table 1B also lists weight average particle diameter, Tg, and peak intensities and peak temperatures of tanδ measured for the commercially available hydrogenated styrene-butadiene copolymer "S1605" manufactured by Asahi Kasei Corporation.

[Production of (B-1)]

30.4 parts of styrene (hereinafter abbreviated as ST), 9.6 parts of acrylonitrile (hereinafter abbreviated as AN), and 0.05 part of t-butylmercaptan were mixed to prepare a monomer mixture (II). In the glass reactor used for producing the acrylic rubbery polymer (R-1) latex, 60 parts (solid content equivalent) of the acrylic rubbery polymer (R-1) latex, 12 parts of water, and 0.36 parts of dodecylbenzene sodium sulfonate were charged, and the temperature was raised to 70° C. under a nitrogen stream while stirring. When the temperature reached 70° C., 52% by mass of the aqueous solution (RED aqueous solution) in which 0.003 parts of ethylenediaminetetraacetic acid tetrasodium dihydrate, 0.001 parts of ferrous sulfate heptahydrate, and 0.05 parts of sodium formaldehyde sulfoxylate were added to 2 parts of water was charged into the reactor. Immediately thereafter, the entire amount of the monomer mixture (II) and 0.06 part of t-butyl hydroperoxide were continuously added over 2 hours and 30 minutes. Polymerization was carried out by continuous addition over a period of time. 150 minutes after starting the polymerization, the remaining 48% by mass of the RED aqueous solution and 0.03 part of t-butyl hydroperoxide were charged into the reactor, and after maintaining at the same temperature for 60 minutes, the polymerization was completed and a graft copolymer (B-1) latex was obtained.

This graft copolymer (B-1) latex was coagulated, washed with water, and dried to obtain a powdery graft copolymer (B-1). The gel content, swelling degree, graft ratio, and molecular weight of the acetonitrile-soluble component of the obtained graft copolymer (B-1) were measured, and the results are shown in Table 2A.

[Production of (B-2) to (B-13) and (BX-1) to (BX-9)]

Using the acrylic rubbery polymers (R-2) to (R-12) and (RX-1) to (RX-9) obtained above, graft copolymers (B-2) to (B-13) and (BX-1) to (BX-9) were produced in the same manner as in (B-1), except that the formulations shown in Tables 2A and 2B were used, respectively.

Tables 2A and 2B show the measurement results of the gel content, swelling degree, graft ratio, and molecular weight of the acetonitrile-soluble component of these graft copolymers.

The acrylic rubbery polymers (R-1) to (R-12) correspond to the polymer (b1) according to the present invention. The graft copolymers (B-1) to (B-13) correspond to the (meth) acrylic acid ester polymer (B) of the present invention in which the polymer (b2) is graft-polymerized to the polymer (b1).

[Table 1A]

TABLE 1A

| Polymer (b1) | | RX-1 | R-1 | R-2 | R-3 | R-4 | R-5 | R-6 | R-7 | RX-2 | RX-3 | R-8 |
|---|---|---|---|---|---|---|---|---|---|---|---|---|
| Raw Material Formulation (part) | BA | 73.65 | 71.22 | 69.32 | 67.37 | 65.43 | 63.50 | 61.35 | 57.67 | 55.96 | 53.80 | 61.50 |
| | MMA | 26.12 | 28.55 | 30.45 | 32.40 | 34.33 | 36.27 | 38.42 | 42.10 | 43.80 | 45.97 | 38.50 |
| | ST | | | | | | | | | | | |
| | AN | | | | | | | | | | | |
| | Crosslinking Agent | 0.23 | 0.23 | 0.23 | 0.23 | 0.23 | 0.23 | 0.23 | 0.23 | 0.23 | 0.23 | 0.00 |
| Tg (° C.) | | −20 | −15 | −11 | −7 | −5 | −3 | 0 | 5 | 7 | 11 | 0 |
| Weight Average Particle Diameter (nm) | | 150 | 150 | 150 | 150 | 150 | 150 | 150 | 150 | 150 | 150 | 70 |
| tan δ | Peak Intensity | 2.224 | 2.194 | 2.165 | 2.145 | 2.136 | 2.120 | 2.099 | 2.075 | 2.062 | 2.047 | 2.181 |
| | Peak Temperature(° C.) | −5.3 | −0.9 | 2.7 | 6.6 | 8.8 | 10.4 | 13.3 | 18.4 | 20.6 | 25.2 | 15.2 |

TABLE 1B

| Polymer (b1) | | R-9 | R-10 | RX-4 | RX-5 | RX-6 | R-11 | RX-7 | RX-8 | R-12 | RX-9 | S1605 |
|---|---|---|---|---|---|---|---|---|---|---|---|---|
| Raw Material Formulation (part) | BA | 65.53 | 65.33 | 65.13 | 61.07 | 60.17 | 61.35 | 77.00 | 65.12 | 63.00 | 99.30 | — |
| | MMA | 34.34 | 34.33 | 34.15 | 38.21 | 37.67 | 38.42 | | | 37.00 | | — |
| | ST | | | | | | | | 34.64 | | | — |
| | AN | | | | | | | 23.00 | | | | — |
| | Crosslinking Agent | 0.13 | 0.33 | 0.72 | 0.72 | 2.17 | 0.23 | 0.00 | 0.23 | 0.00 | 0.70 | — |
| Tg (° C.) | | −5 | −5 | −5 | 0 | 0 | 0 | 0 | −3 | 0 | −56 | 7 |
| Weight Average Particle Diameter (nm) | | 150 | 150 | 150 | 70 | 70 | 70 | 60 | 90 | 70 | 140 | — |
| tan δ | Peak Intensity | 2.153 | 2.086 | 2040 | 1.926 | 1.465 | 2.183 | 1.495 | 2.055 | 2.183 | 2.446 | 1.349 |
| | Peak Temperature(° C.) | 8.7 | 9.4 | 9.7 | 18.2 | 17.9 | 12.7 | 17.8 | 11.0 | 12.7 | −32.1 | 17.4 |

TABLE 2A

| (Meth)acrylic Acid Ester Polymer (B) | | | BX-1 | B-1 | B-2 | B-3 | B-4 | B-5 | B-6 | B-7 | BX-2 | BX-3 | B-8 | B-9 | B-10 | BX-4 |
|---|---|---|---|---|---|---|---|---|---|---|---|---|---|---|---|---|
| Raw Material Formulation (part) | Polymer (b1) | Kinds | RX-1 | R-1 | R-2 | R-3 | R-4 | R-5 | R-6 | R-7 | RX-2 | RX-3 | R-8 | R-9 | R-10 | RX-4 |
| | | Amount | 60 | 60 | 60 | 60 | 60 | 60 | 60 | 60 | 60 | 60 | 60 | 60 | 60 | 60 |
| | Polymer (b2) | ST | 30.4 | 30.4 | 30.4 | 30.4 | 30.4 | 30.4 | 30.4 | 30.4 | 30.4 | 30.4 | 30.4 | 30.4 | 30.4 | 30.4 |
| | | AN | 9.6 | 9.6 | 9.6 | 9.6 | 9.6 | 9.6 | 9.6 | 9.6 | 9.6 | 9.6 | 9.6 | 9.6 | 9.6 | 9.6 |
| | | MMA | — | — | — | — | — | — | — | — | — | — | — | — | — | — |
| Polymer (b1)/Polymer (b2) mass ratio | | | 60/40 | 60/40 | 60/40 | 60/40 | 60/40 | 60/40 | 60/40 | 60/40 | 60/40 | 60/40 | 60/40 | 60/40 | 60/40 | 60/40 |
| Gel Content (%) | | | 88 | 89 | 88 | 87 | 86 | 86 | 85 | 86 | 84 | 85 | 1 | 80 | 88 | 88 |
| Swelling Degree (%) | | | 1680 | 1600 | 1630 | 1500 | 1430 | 1390 | 1330 | 1270 | 1260 | 1210 | >3000 | 2680 | 1190 | 970 |
| Grafting Ratio (%) | | | 61.3 | 61.1 | 61.5 | 61.1 | 60.5 | 59.8 | 58.7 | 59.0 | 58.6 | 58.5 | 37.1 | 58.0 | 60.9 | 59.4 |
| Molecular Weight of Acetonitrile-soluble Component | | | 61500 | 59700 | 62300 | 63500 | 64700 | 61500 | 58700 | 59500 | 58500 | 59800 | 60000 | 59400 | 62200 | 61100 |

TABLE 2B

| (Meth)acrylic Acid Ester Polymer (B) | | | BX-5 | BX-6 | B-11 | B-12 | BX-7 | BX-8 | B-13 | BX-9 | S1605 |
|---|---|---|---|---|---|---|---|---|---|---|---|
| Raw Material Formulation (part) | Polymer (b1) | Kinds | RX-5 | RX-6 | R-11 | R-11 | RX-7 | RX-8 | R-12 | RX-9 | S1605 |
| | | Amount | 60 | 60 | 60 | 60 | 60 | 60 | 40 | 50 | — |
| | Polymer (b2) | ST | 30.4 | 30.4 | — | 8.4 | 30.4 | 30.4 | 45.5 | 36.5 | — |
| | | AN | 9.6 | 9.6 | — | 2.8 | 9.6 | 9.6 | 14.6 | 13.5 | — |
| | | MMA | — | — | 40 | 28.8 | — | — | — | — | — |
| Polymer (b1)/Polymer (b2) mass ratio | | | 60/40 | 60/40 | 60/40 | 60/40 | 60/40 | 60/40 | 40/60 | 50/50 | — |
| Gel Content (%) | | | 89 | 92 | 85 | 85 | 1 | 74 | 1 | 73 | — |
| Swelling Degree (%) | | | 980 | 570 | 1330 | 1330 | >3000 | 2640 | >3000 | 1400 | — |
| Grafting Ratio (%) | | | 61.2 | 61.9 | Inseparable | 47.4 | Inseparable | 51.8 | 116.4 | 65.0 | — |

TABLE 2B-continued

| (Meth)acrylic Acid Ester Polymer (B) | BX-5 | BX-6 | B-11 | B-12 | BX-7 | BX-8 | B-13 | BX-9 | S1605 |
|---|---|---|---|---|---|---|---|---|---|
| Molecular Weight of Acetonitrile-soluble Component | 60800 | 63600 | Inseparable | 63500 | Inseparable | 52400 | 69700 | 85300 | — |

Examples I-1 to 18, II-1 to 18, Comparative Examples I-1 to 11, II-1 to 11

[Production of Thermoplastic Resin Composition]

The ingredients shown in Table 3A, 3B, 4A, or 4B were mixed together at the compounding ratio shown in the table. Subsequently, the mixture was melt-kneaded at 250° C. with a twin screw extruder (model name: TEX44, The Japan Steel Works, Ltd.) to be pelletized. The following measurements and evaluations were performed on the obtained resin compositions. The results are shown in Table 3A, 3B, 4A, or 4B below.

[Evaluation Methods]

<Sound Pressure Measurement of Hitting Sound>

Using each thermoplastic resin composition, injection molding performed under the conditions of a cylinder of temperature 240° C., a mold temperature of 60° C., and an injection rate of 10g/see to form a plate-shaped molded article having a length of 80 mm, width of 54 mm, and thickness of 2.4 mm. The trapezoidal projection having an upper base of 20 mm, a lower base of 40 mm, a height of 8 mm, and a thickness of 1.5 mm. The injection molding was performed at a cylinder temperature of 240° C., an injection pressure of 150 MPa, and a mold temperature of 60° C. The obtained molded article was cut with a universal cutter into a shape having a length of 60 mm, a width of 60 mm, and a thickness of 3 mm, and the cut molded article was drilled to have holes having a diameter of 1 mm, the holes being drilled with a drill press, at a position 5 mm from an upper side and 5 mm from a left side and at a position 5 mm from the upper side and 5 mm from a right side, in the cut molded article. In this manner, a test specimen as illustrated in FIG. 1 was prepared. A kite string was passed through the two holes of the test specimen, and the test specimen was hung from an H-type stand with clamps and muffs. The clamp was mounted at a height of 28 cm from the bench. Furthermore, the test specimen was mounted at a height of 18 cm, which was a height from the bench to a middle of one surface of the test specimen. In this instance, a distance between the clamps, from which the test specimen was hung, to the upper side of the test specimen was 6 cm. Furthermore, a sound pressure microphone (trade name: 378B02), manufactured by PCB Piezotronics, was installed at a position 10 cm from the position of the middle of the surface of the hung test specimen in a perpendicular direction with respect to the surface of the test specimen. The sound pressure microphone was mounted on an H-type stand with clamps and muffs, in a direction toward the surface of the test specimen. Furthermore, the sound pressure microphone was mounted at a height of 18 cm from the bench.

Thereafter, a middle of a surface of the test specimen opposite to the position of the installed microphone was struck with a force of 35N to 40N with an impact hammer (trade name: 086E80) manufactured by PCB Piezotronics, which can measure a striking force, and the resulting sounds were collected with the sound pressure microphone and converted into a sound pressure-frequency spectrum with a Fourier transform analyzer (trade name: Multi JOB FFT Analyzer OR34J-4) manufactured by OROS. The maximum value of the sound pressures (dB) and the corresponding frequency (Hz) in the obtained frequency spectrum were used as measured values.

Note that the measurement was performed in a room with a room temperature of 23° C.

<Attenuation of Hitting Sound>

An operation similar to that for the measurement of the sound pressure of hitting sounds was performed, and temporal changes in the sound pressure were measured with the Fourier transform analyzer (trade name: Multi JOB FFT Analyzer OR34J-4) manufactured by OROS. The time required for the sound pressure to subside to ¼ of the maximum sound pressure after the sound was generated was used as the decay time of the hitting sound.

The attenuation of hitting sound is preferably less than 0.008 seconds, more preferably less than 0.006 seconds in the styrene resin formulations of Examples I-1 to I-18 and Comparative Examples I-1 to 11. In the PC alloy formulations of Examples II-1 to 18 and Comparative Examples II-1 to 11, the time is preferably less than 0.008 seconds, and more preferably less than 0.007 seconds.

<MVR>

A melt mass flow rate of each thermoplastic resin composition was measured in accordance with ISO 1133, under conditions including a temperature of 240° C. and a load of 98 N.

<Charpy Impact Strength>

The pellets of the thermoplastic resin composition obtained by melt-kneading were molded using an injection molding machine ("IS55FP-1.5A" manufactured by Toshiba Machine Co., Ltd.,) under conditions of a cylinder temperature of 240° C. and a mold temperature of 60° C., to obtain a molded article having a length of 80 mm, a width of 10 mm and a thickness of 4 mm and was used as a molded article for Charpy impact testing.

The Charpy impact strength (impact direction: edgewise) of the obtained molded article (type B1, having notch: shape A, single notch) was measured at a test temperature of 23° C. or −30° C. in accordance with ISO 179-1: 2013 edition. The higher the Charpy impact strength, the better the impact resistance.

<Tensile Yield Stress>

A measurement was performed in accordance with ISO527.

<Tensile Elongation at Break>

A measurement was performed in accordance with ISO527.

<Tensile Modulus>

A measurement was performed in accordance with ISO527.

<Bending Strength>

A measurement was performed in accordance with ISO178.

<Bending Modulus (Rigidity)>

A measurement was performed in accordance with ISO178.

<Deflection Temperature under Load>

A measurement was performed in accordance with ISO 75 under a loading condition of 1.8 MPa.

<Rockwell Hardness>

A measurement was performed in accordance with ISO 2039.

<Gloss>

100 parts of pellets of each of the thermoplastic resin compositions and 0.8 parts of carbon black were mixed together in a Henschel mixer. The mixture was fed to an extruder heated at 250° C. and kneaded to give black pellets. The black pellets were injection-molded under conditions including a cylinder temperature of 240° C., a mold temperature of 60° C., and an injection rate of 20 g/second, to give a plate-shaped molded body having a length of 100 mm, a width of 100 mm, and a thickness of 3 mm.

A reflectance (%) of a surface of the molded body was measured in accordance with ISO2813 at an incident angle of 600 and a reflection angle of 60°, with a "Gloss Meter VG7000" manufactured by Nippon Denshoku Industries Co., Ltd.,". Higher reflectance values indicate better surface appearances.

<Evaluation of Squeaks (Abnormal Noise Risk Value)>

Each of the thermoplastic resin compositions was injection-molded in an injection molding machine IS-170FA, manufactured by Toshiba Machine Co., Ltd., to form an injection-molded plate having a length of 150 mm, a width of 100 mm, and a thickness of 4 mm. The injection molding was performed at a cylinder temperature of 250° C., an injection pressure of 50 MPa, and a mold temperature of 60° C. A test specimen having a length of 60 mm, a width of 100 mm, and a thickness of 4 mm and a test specimen having a length of 50 mm, a width of 25 mm, and a thickness of 4 mm were cut from the plate with a disc saw. The test specimens were chamfered at end portions with #100 grit sandpaper, and subsequently, small burrs were removed with a utility knife. The two plates, large and small, were used as test specimens.

The two test specimens were aged in an oven at an adjusted temperature of 80° C.±5° C. for 300 hours and then cooled at 25° C. for 24 hours. Subsequently, the large test specimen and the small test specimen were secured to a stick-slip tester SSP-02, manufactured by Ziegler-Instruments, and rubbed against each other three times at an amplitude of 20 mm, in an atmosphere at a temperature of 23° C. and a humidity of 50% RH, under four conditions: a load of 5 N, a load of 40 N, a speed of 1 mm/second, and a speed of 10 mm/second. Abnormal noise risk values resulting from this operation were measured. The value of the condition under which the abnormal noise risk value was a maximum was extracted and designated as the measured value. The larger the abnormal noise risk value, the higher the risk of the generation of squeaks. Abnormal noise risk values of less than or equal to 3 are favorable.

[Table 3A]

TABLE 3A

| | | Comparative Example I-1 | Example I-1 | Example I-2 | Example I-3 | Example I-4 | Example I-5 | Example I-6 | Comparative Example I-2 |
|---|---|---|---|---|---|---|---|---|---|
| Styrenic Resin Formulation (part) | Hitting Sound Reduction Material ((meth)acrylic acid ester polymer) Kinds | BX-1 | B-1 | B-2 | B-3 | B-4 | B-4 | B-4 | B-4 |
| | Amount | 15 | 15 | 30 | 25 | 10 | 15 | 35 | 0 |
| | A1-1 | 12 | 12 | 3 | 2 | 17 | 12 | 0 | 27 |
| | A1-2 | 12 | 12 | 12 | 12 | 12 | 12 | 12 | 12 |
| | A2-1 | 21 | 21 | 15 | 21 | 21 | 21 | 13 | 21 |
| | A2-2 | 40 | 40 | 40 | 40 | 40 | 40 | 40 | 40 |
| Evaluation Results | Maximum Measured Sound Pressure(dB) | 69.5 | 68.7 | 66.4 | 66.2 | 68.8 | 67.3 | 65.1 | 73.4 |
| | Maximum Frequency(Hz) | 1610 | 1600 | 1570 | 1680 | 1640 | 1640 | 1540 | 1630 |
| | Hitting Sound Attenuation (second) | 0.005 | 0.005 | 0.003 | 0.003 | 0.005 | 0.003 | 0.002 | 0.010 |
| | MVR (cm$^3$/10 min) | 9 | 10 | 9 | 13 | 9 | 10 | 8 | 7 |
| | Charpy Impact Strength (23° C.)(kJ/m$^2$) | 20 | 19 | 11 | 10 | 18 | 17 | 6 | 23 |
| | Tensile Yield Stress(MPa) | 43 | 42 | 39 | 43 | 42 | 42 | 37 | 42 |
| | Tensile Elongation at Break(%) | 21 | 17 | 16 | 18 | 21 | 20 | 14 | 25 |
| | Bending Strength(MPa) | 63 | 63 | 58 | 64 | 63 | 63 | 56 | 63 |
| | Bending Modulus (MPa) | 2030 | 2040 | 1870 | 2070 | 2050 | 2050 | 1750 | 2030 |
| | Deflection Temperature under Load(° C.) | 90 | 90 | 87 | 90 | 90 | 90 | 85 | 90 |
| | Rockwell Hardness (R) | 103 | 103 | 97 | 104 | 103 | 103 | 94 | 103 |
| | Gloss (%) | 97 | 98 | 97 | 98 | 98 | 97 | 95 | 98 |
| | Squeaks Risk Value | 1 | 1 | 2 | 1 | 1 | 1 | 2 | 1 |

| | | Example I-7 | Example I-8 | Example I-9 | Comparative Example I-3 | Comparative Example I-4 | Example I-10 | Example I-11 | Example I-12 | Comparative Example I-5 |
|---|---|---|---|---|---|---|---|---|---|---|
| Styrenic Resin Formulation (part) | Hitting Sound Reduction Material ((meth)acrylic acid ester polymer) Kinds | B-5 | B-6 | B-7 | BX-2 | BX-3 | B-8 | B-9 | B-10 | BX-4 |
| | Amount | 20 | 15 | 15 | 15 | 15 | 15 | 15 | 15 | 15 |
| | A1-1 | 7 | 12 | 12 | 12 | 12 | 12 | 12 | 12 | 12 |
| | A1-2 | 12 | 12 | 12 | 12 | 12 | 12 | 12 | 12 | 12 |
| | A2-1 | 21 | 21 | 21 | 21 | 21 | 21 | 21 | 21 | 21 |
| | A2-2 | 40 | 40 | 40 | 40 | 40 | 40 | 40 | 40 | 40 |
| Evaluation Results | Maximum Measured Sound Pressure(dB) | 66.9 | 68.0 | 68.4 | 69.0 | 69.9 | 67.8 | 67.6 | 67.8 | 68.9 |
| | Maximum Frequency(Hz) | 1660 | 1650 | 1660 | 1670 | 1690 | 1660 | 1650 | 1650 | 1650 |
| | Hitting Sound Attenuation (second) | 0.003 | 0.004 | 0.005 | 0.005 | 0.006 | 0.004 | 0.004 | 0.004 | 0.005 |
| | MVR (cm$^3$/10 min) | 12 | 12 | 13 | 13 | 13 | 8 | 9 | 9 | 9 |

TABLE 3A-continued

| | | | | | | | | | |
|---|---|---|---|---|---|---|---|---|---|
| Charpy Impact Strength (23° C.)(kJ/m$^2$) | 11 | 15 | 13 | 13 | 12 | 14 | 15 | 15 | 7 |
| Tensile Yield Stress(MPa) | 43 | 43 | 44 | 44 | 44 | 44 | 42 | 42 | 42 |
| Tensile Elongation at Break(%) | 21 | 17 | 20 | 16 | 19 | 14 | 21 | 19 | 16 |
| Bending Strength(MPa) | 64 | 64 | 65 | 65 | 65 | 64 | 63 | 63 | 63 |
| Bending Modulus (MPa) | 2060 | 2060 | 2060 | 2060 | 2070 | 2070 | 2040 | 2050 | 2050 |
| Deflection Temperature under Load(° C.) | 91 | 90 | 90 | 90 | 91 | 91 | 90 | 90 | 90 |
| Rockwell Hardness (R) | 104 | 104 | 104 | 104 | 105 | 103 | 103 | 103 | 103 |
| Gloss (%) | 98 | 97 | 98 | 98 | 98 | 88 | 96 | 97 | 99 |
| Squeaks Risk Value | 1 | 1 | 1 | 1 | 1 | 1 | 1 | 1 | 1 |

TABLE 3B

| | | | Comparative Example I-6 | Comparative Example I-7 | Example I-13 | Example I-14 | Comparative Example I-8 | Comparative Example I-9 |
|---|---|---|---|---|---|---|---|---|
| Styrenic Resin Formulation (part) | Hitting Sound Reduction Material ((meth)acrylic acid ester polymer) | Kinds | BX-5 | BX-6 | B-11 | B-12 | BX-7 | BX-8 |
| | | Amount | 15 | 15 | 15 | 15 | 15 | 15 |
| | A1-1 | | 12 | 12 | 12 | 12 | 12 | 12 |
| | A1-2 | | 12 | 12 | 12 | 12 | 12 | 12 |
| | A2-1 | | 21 | 21 | 21 | 21 | 21 | 21 |
| | A2-2 | | 40 | 40 | 40 | 40 | 40 | 40 |
| Evaluation Results | Maximum Measured Sound Pressure(dB) | | 68.9 | 70.5 | 65.5 | 65.5 | 70.5 | 68.9 |
| | Maximum Frequency(Hz) | | 1660 | 1660 | 1650 | 1700 | 1680 | 1680 |
| | Hitting Sound Attenuation (second) | | 0.005 | 0.006 | 0.004 | 0.004 | 0.004 | 0.005 |
| | MVR (cm$^3$/10 min) | | 8 | 8 | 8 | 11 | 14 | 7 |
| | Charpy Impact Strength (23° C.)(kJ/m$^2$) | | 6 | 4 | 12 | 17 | 13 | 12 |
| | Tensile Yield Stress(MPa) | | 43 | 44 | 42 | 42 | 43 | 43 |
| | Tensile Elongation at Break(%) | | 15 | 18 | 15 | 19 | 21 | 17 |
| | Bending Strength(MPa) | | 64 | 64 | 62 | 62 | 64 | 64 |
| | Bending Modulus (MPa) | | 2060 | 2060 | 2030 | 2040 | 2060 | 2070 |
| | Deflection Temperature under Load(° C.) | | 90 | 91 | 91 | 90 | 90 | 91 |
| | Rockwell Hardness (R) | | 104 | 104 | 103 | 102 | 104 | 104 |
| | Gloss (%) | | 99 | 99 | 97 | 97 | 86 | 90 |
| | Squeaks Risk Value | | 1 | 1 | 1 | 1 | 1 | 1 |

| | | | Example I-15 | Example I-16 | Example I-17 | Example I-18 | Comparative Example I-10 | Comparative Example I-11 |
|---|---|---|---|---|---|---|---|---|
| Styrenic Resin Formulation (part) | Hitting Sound Reduction Material ((meth)acrylic acid ester polymer) | Kinds | B-13 | B-4 | B-4 | B-4 | BX-9 | S1605 |
| | | Amount | 23 | 15 | 21 | 27 | 18 | 9 |
| | A1-1 | | 12 | 24 | 6 | 0 | 12 | 12 |
| | A1-2 | | 12 | 0 | 12 | 18 | 12 | 12 |
| | A2-1 | | 13 | 21 | 21 | 15 | 18 | 27 |
| | A2-2 | | 40 | 40 | 40 | 40 | 40 | 40 |
| Evaluation Results | Maximum Measured Sound Pressure(dB) | | 68.4 | 67.5 | 66.3 | 65.3 | 73.3 | 67.0 |
| | Maximum Frequency(Hz) | | 1660 | 1680 | 1660 | 1580 | 1600 | 1650 |
| | Hitting Sound Attenuation (second) | | 0.004 | 0.003 | 0.003 | 0.003 | 0.010 | 0.003 |
| | MVR (cm$^3$/10 min) | | 6 | 8 | 12 | 8 | 11 | 28 |
| | Charpy Impact Strength (23° C.)(kJ/m$^2$) | | 16 | 21 | 11 | 10 | 15 | 9 |
| | Tensile Yield Stress(MPa) | | 44 | 41 | 42 | 40 | 41 | 41 |
| | Tensile Elongation at Break(%) | | 16 | 23 | 24 | 18 | 22 | 17 |
| | Bending Strength(MPa) | | 63 | 62 | 64 | 58 | 63 | 64 |
| | Bending Modulus (MPa) | | 2070 | 2070 | 2060 | 1880 | 2050 | 2130 |
| | Deflection Temperature under Load(° C.) | | 90 | 91 | 90 | 87 | 90 | 90 |
| | Rockwell Hardness (R) | | 103 | 104 | 104 | 98 | 103 | 103 |
| | Gloss (%) | | 89 | 96 | 98 | 97 | 99 | 97 |
| | Squeaks Risk Value | | 1 | 6 | 2 | 1 | 1 | 1 |

TABLE 4A

| | | | Comparative Example II-1 | Example II-1 | Example II-2 | Example II-3 | Example II-4 | Example II-5 | Example II-6 | Comparative Example II-2 |
|---|---|---|---|---|---|---|---|---|---|---|
| PC Resin Formulation (part) | Hitting Sound Reduction Material ((meth)acrylic acid ester polymer) | Kinds | BX-1 | B-1 | B-2 | B-3 | B-4 | B-4 | B-4 | B-4 |
| | | Amount | 8 | 8 | 8 | 5 | 8 | 6 | 15 | 0 |
| | | A1-1 | 7 | 7 | 7 | 10 | 7 | 9 | 3 | 15 |
| | | A1-2 | 9 | 9 | 9 | 9 | 9 | 9 | 9 | 9 |
| | | A2-1 | 11 | 11 | 11 | 11 | 11 | 11 | 8 | 11 |
| | | A3-1 | 65 | 65 | 65 | 65 | 65 | 65 | 65 | 65 |
| Evaluation Results | Maximum Measured Sound Pressure(dB) | | 70.8 | 70.2 | 69.8 | 70.7 | 67.7 | 69.7 | 65.4 | 74.6 |
| | Maximum Frequency(Hz) | | 1510 | 1520 | 1510 | 1520 | 1540 | 1520 | 1460 | 1520 |
| | Hitting Sound Attenuation (second) | | 0.007 | 0.006 | 0.006 | 0.007 | 0.003 | 0.005 | 0.003 | 0.010 |
| | MVR (cm$^3$/10 min) | | 14 | 15 | 14 | 13 | 15 | 14 | 12 | 11 |
| | Charpy Impact Strength (23° C.)(kJ/m$^2$) | | 64 | 62 | 65 | 62 | 62 | 62 | 65 | 63 |
| | Charpy Impact Strength (−30° C.)(kJ/m$^2$) | | 43 | 41 | 43 | 41 | 42 | 41 | 33 | 45 |
| | Tensile Yield Stress(MPa) | | 45 | 45 | 45 | 45 | 45 | 45 | 43 | 45 |
| | Tensile Elongation at Break(%) | | 93 | 95 | 90 | 88 | 92 | 87 | 89 | 91 |
| | Bending Strength(MPa) | | 1840 | 1840 | 1840 | 1840 | 1850 | 1850 | 1790 | 1840 |
| | Bending Modulus (MPa) | | 64 | 64 | 64 | 64 | 64 | 64 | 63 | 64 |
| | Deflection Temperature under Load(° C.) | | 105 | 105 | 105 | 106 | 105 | 106 | 104 | 105 |
| | Rockwell Hardness (R) | | 105 | 105 | 105 | 105 | 106 | 106 | 104 | 105 |
| | Gloss (%) | | 99 | 99 | 99 | 99 | 99 | 99 | 97 | 99 |
| | Squeaks Risk Value | | 2 | 2 | 2 | 1 | 1 | 1 | 2 | 1 |

| | | | Example II-7 | Example II-8 | Example II-9 | Comparative Example II-3 | Comparative Example II-4 | Example II-10 | Example II-11 | Example II-12 | Comparative Example II-5 |
|---|---|---|---|---|---|---|---|---|---|---|---|
| PC Resin Formulation (part) | Hitting Sound Reduction Material ((meth)acrylic acid ester polymer) | Kinds | B-5 | B-6 | B-7 | BX-2 | BX-3 | B-8 | B-9 | B-10 | BX-4 |
| | | Amount | 20 | 8 | 8 | 8 | 8 | 8 | 8 | 8 | 8 |
| | | A1-1 | 0 | 7 | 7 | 7 | 7 | 7 | 7 | 7 | 7 |
| | | A1-2 | 9 | 9 | 9 | 9 | 9 | 9 | 9 | 9 | 9 |
| | | A2-1 | 6 | 11 | 11 | 11 | 11 | 11 | 11 | 11 | 11 |
| | | A3-1 | 65 | 65 | 65 | 65 | 65 | 65 | 65 | 65 | 65 |
| Evaluation Results | Maximum Measured Sound Pressure(dB) | | 65.2 | 69.5 | 70.2 | 70.9 | 72.5 | 68.5 | 67.6 | 67.8 | 70.0 |
| | Maximum Frequency(Hz) | | 1420 | 1550 | 1550 | 1550 | 1560 | 1550 | 1540 | 1540 | 1540 |
| | Hitting Sound Attenuation (second) | | 0.003 | 0.004 | 0.005 | 0.005 | 0.006 | 0.005 | 0.003 | 0.003 | 0.005 |
| | MVR (cm$^3$/10 min) | | 13 | 16 | 15 | 16 | 16 | 13 | 13 | 13 | 12 |
| | Charpy Impact Strength (23° C.)(kJ/m$^2$) | | 60 | 60 | 62 | 60 | 60 | 60 | 62 | 63 | 60 |
| | Charpy Impact Strength (−30° C.)(kJ/m$^2$) | | 20 | 40 | 42 | 40 | 41 | 45 | 43 | 41 | 23 |
| | Tensile Yield Stress(MPa) | | 41 | 46 | 47 | 47 | 47 | 46 | 45 | 45 | 45 |
| | Tensile Elongation at Break(%) | | 92 | 690 | 92 | 89 | 88 | 95 | 88 | 89 | 87 |
| | Bending Strength(MPa) | | 1720 | 1860 | 1870 | 18570 | 1870 | 1860 | 1840 | 1850 | 1850 |
| | Bending Modulus (MPa) | | 61 | 65 | 65 | 65 | 65 | 64 | 64 | 64 | 64 |
| | Deflection Temperature under Load(° C.) | | 102 | 107 | 106 | 106 | 106 | 106 | 105 | 105 | 105 |
| | Rockwell Hardness (R) | | 103 | 106 | 106 | 106 | 106 | 106 | 106 | 106 | 106 |
| | Gloss (%) | | 96 | 99 | 99 | 99 | 99 | 93 | 98 | 99 | 99 |
| | Squeaks Risk Value | | 3 | 1 | 1 | 2 | 1 | 2 | 2 | 1 | 2 |

TABLE 4B

| | | | Comparative Example II-6 | Comparative Example II-7 | Example II-13 | Example II-14 | Comparative Example II-8 | Comparative Example II-9 |
|---|---|---|---|---|---|---|---|---|
| PC Resin Formulation (part) | Hitting Sound Reduction Material ((meth)acrylic acid ester polymer) | Kind | BX-5 | BX-6 | B-11 | B-12 | BX-7 | BX-8 |
| | | Amount | 8 | 8 | 8 | 8 | 8 | 8 |
| | | A1-1 | 7 | 7 | 7 | 7 | 7 | 7 |
| | | A1-2 | 9 | 9 | 9 | 9 | 9 | 9 |
| | | A2-1 | 11 | 11 | 11 | 11 | 11 | 11 |
| | | A3-1 | 65 | 65 | 65 | 65 | 65 | 65 |

TABLE 4B-continued

| Evaluation Results | Maximum Measured Sound Pressure(dB) | 70.1 | 72.2 | 67.5 | 67.7 | 71.7 | 70.5 |
|---|---|---|---|---|---|---|---|
| | Maximum Frequency(Hz) | 1560 | 1540 | 1560 | 1540 | 1540 | 1540 |
| | Hitting Sound Attenuation (second) | 0.005 | 0.007 | 0.004 | 0.004 | 0.006 | 0.005 |
| | MVR (cm$^3$/10 min) | 12 | 13 | 12 | 15 | 16 | 13 |
| | Charpy Impact Strength (23° C.)(kJ/m$^2$) | 62 | 65 | 52 | 58 | 61 | 60 |
| | Charpy Impact Strength (−30° C.)(kJ/m$^2$) | 23 | 20 | 40 | 45 | 42 | 40 |
| | Tensile Yield Stress(MPa) | 46 | 46 | 46 | 46 | 46 | 46 |
| | Tensile Elongation at Break(%) | 85 | 90 | 80 | 93 | 92 | 83 |
| | Bending Strength(MPa) | 1860 | 1860 | 1840 | 1830 | 1860 | 1860 |
| | Bending Modulus (MPa) | 65 | 65 | 64 | 64 | 65 | 64 |
| | Deflection Temperature under Load(° C.) | 106 | 106 | 106 | 106 | 105 | 105 |
| | Rockwell Hardness (R) | 106 | 106 | 106 | 106 | 106 | 106 |
| | Gloss (%) | 100 | 100 | 99 | 99 | 92 | 94 |
| | Squeaks Risk Value | 1 | 1 | 2 | 2 | 2 | 1 |

| | | | Example II-15 | Example II-16 | Example II-17 | Example II-18 | Comparative Example II-10 | Comparative Example II-11 |
|---|---|---|---|---|---|---|---|---|
| PC Resin Formulation (part) | Hitting Sound Reduction Material ((meth)acrylic acid ester polymer) | Kind | B-13 | B-4 | B-4 | B-4 | BX-9 | S1605 |
| | | Amount | 12 | 8 | 12 | 15 | 10 | 5 |
| | A1-1 | | 7 | 16 | 3 | 0 | 7 | 7 |
| | A1-2 | | 9 | 0 | 9 | 12 | 9 | 9 |
| | A2-1 | | 7 | 11 | 11 | 8 | 9 | 14 |
| | A3-1 | | 65 | 65 | 65 | 65 | 65 | 65 |
| Evaluation Results | Maximum Measured Sound Pressure(dB) | | 69.6 | 67.9 | 66.4 | 65.6 | 74.4 | 67.7 |
| | Maximum Frequency(Hz) | | 1550 | 1550 | 1550 | 1470 | 1510 | 1540 |
| | Hitting Sound Attenuation (second) | | 0.006 | 0.003 | 0.003 | 0.003 | 0.010 | 0.003 |
| | MVR (cm$^3$/10 min) | | 12 | 11 | 15 | 13 | 14 | 23 |
| | Charpy Impact Strength (23° C.)(kJ/m$^2$) | | 64 | 65 | 62 | 62 | 52 | 破断せず |
| | Charpy Impact Strength (−30° C.)(kJ/m$^2$) | | 46 | 49 | 34 | 27 | 43 | 23 |
| | Tensile Yield Stress(MPa) | | 46 | 44 | 46 | 43 | 44 | 47 |
| | Tensile Elongation at Break(%) | | 90 | 91 | 84 | 90 | 90 | 90 |
| | Bending Strength(MPa) | | 1850 | 1860 | 1870 | 1790 | 1830 | 1910 |
| | Bending Modulus (MPa) | | 65 | 63 | 65 | 63 | 64 | 67 |
| | Deflection Temperature under Load(° C.) | | 105 | 106 | 105 | 104 | 105 | 104 |
| | Rockwell Hardness (R) | | 106 | 107 | 107 | 105 | 105 | 107 |
| | Gloss (%) | | 95 | 98 | 99 | 99 | 100 | 100 |
| | Squeaks Risk Value | | 1 | 10 | 2 | 2 | 1 | 1 |

From the above results, the thermoplastic compositions of Examples containing the hitting sound reducing material made of the (meth)acrylic acid ester polymer (B) of the present invention have excellent hitting sound reduction effects, good gloss, and excellent appearance, and are also excellent in mechanical strength such as impact resistance.

On the other hand, in the thermoplastic resin compositions of Comparative Examples I-1 to 10 and Comparative Examples II-1 to 10, which used (meth)acrylic acid ester polymers that did not meet the provisions of the present invention as the hitting sound reducing material, have poor sound reduction effects.

Comparative Example I-11, in which a conventional thermoplastic elastomer was used as a hitting sound reducing material, has poor impact resistance, and Comparative Example II-11 has poor low-temperature impact resistance.

Although the present invention has been described in detail by way of the specific modes, it is apparent for those skilled in the art that various changes can be made without departing from the spirit and scope of the present invention.

The present application is based on Japanese Patent Application No. 2022-192966 filed on Dec. 1, 2022, the entire contents of which are incorporated herein by reference.

The invention claimed is:

1. A hitting sound reducing material made of a (meth) acrylic acid ester polymer (B) comprising:
 a polymer (b1) comprising a structural unit derived from an acrylic ester compound and a structural unit derived from a methacrylic ester compound, and having a glass transition temperature of −15° C. to +5° C.; and
 a polymer (b2) comprising at least one selected from the group consisting of a structural unit derived from a methacrylic acid ester compound, a structural unit derived from an aromatic vinyl compound, and a structural unit derived from a vinyl cyanide compound,
 wherein the polymer (b1) has a temperature (peak temperature) indicating a peak value of a main dispersion of tan δ measured by the following method of −5° C. to +20° C., and a peak intensity, which is a peak value of the intensity, of 2.055 or more, <Method for measuring Tan δ>
A sheet having a thickness of 1.0 to 1.1 mm is molded by a heat press at a set temperature of 150° C. using the polymer (b1), and a measurement sample is prepared by cutting out a piece having a length of 36 mm and width of 10 mm from the sheet, Using the following dynamic viscoelasticity measurement device, 8 mm portions of each long side of the measurement sample are fixed with a tension jig, tan δ is measured under the following conditions, and the peak temperature and peak intensity are determined;

Measuring device: Dynamic viscoelasticity measuring device ("DMA850" manufactured by TA Instruments Com)
Mode: Tension
Frequency: 1 Hz
Heating rate: 5° C./min
Measurement temperature: −60 to +60° C.

2. The hammering sound reducing material according to claim 1, wherein
the (meth)acrylic acid ester polymer (B) has a swelling degree of THF-insoluble component of 1000% or more as measured by the following method, <Method for measuring swelling degree>
After immersing the (meth)acrylic acid ester polymer (B) in tetrahydrofuran (THF) for 24 hours, the insoluble component separated through a centrifugal separation operation is vacuum-dried and its weight (weight b) is measured, After immersing the obtained THF-insoluble component in THF again for 24 hours, the weight (weight c) of the sample swollen with THF is measured, and the swelling degree of the THF-insoluble component is determined by the following formula, Swelling degree (%)=$c/b \times 100$.

3. A thermoplastic resin composition comprising a resin component (A) containing a rubber-reinforced styrenic thermoplastic resin (A1) and the hitting sound reducing material according to claim 1.

4. A thermoplastic resin composition comprising a resin component (A) containing a rubber-reinforced styrenic thermoplastic resin (A1) and the hitting sound reducing material according to claim 2.

5. The thermoplastic resin composition according to claim 3, wherein the thermoplastic resin composition contains 95 to 70 parts by mass of the resin component (A) and 5 to 30 parts by mass of the hitting sound reducing material (wherein, the total of the resin component (A) and the hitting sound reducing material is 100 parts by mass).

* * * * *